Nov. 6, 1962  J. RUTKUS, JR., ET AL  3,062,536
SHEET STRIPPING APPARATUS
Filed July 2, 1959  26 Sheets-Sheet 1

INVENTORS
JOHN RUTKUS, JR.
GEORGE R. MOTT
BY
ATTORNEY

Nov. 6, 1962    J. RUTKUS, JR., ETAL    3,062,536
SHEET STRIPPING APPARATUS
Filed July 2, 1959    26 Sheets-Sheet 2

INVENTORS
JOHN RUTKUS, JR.
GEORGE R. MOTT
BY
ATTORNEY

Nov. 6, 1962  J. RUTKUS, JR., ETAL  3,062,536
SHEET STRIPPING APPARATUS
Filed July 2, 1959  26 Sheets-Sheet 3

INVENTORS
JOHN RUTKUS, JR.
GEORGE R. MOTT
BY
ATTORNEY

Nov. 6, 1962  J. RUTKUS, JR., ET AL  3,062,536
SHEET STRIPPING APPARATUS
Filed July 2, 1959  26 Sheets-Sheet 4
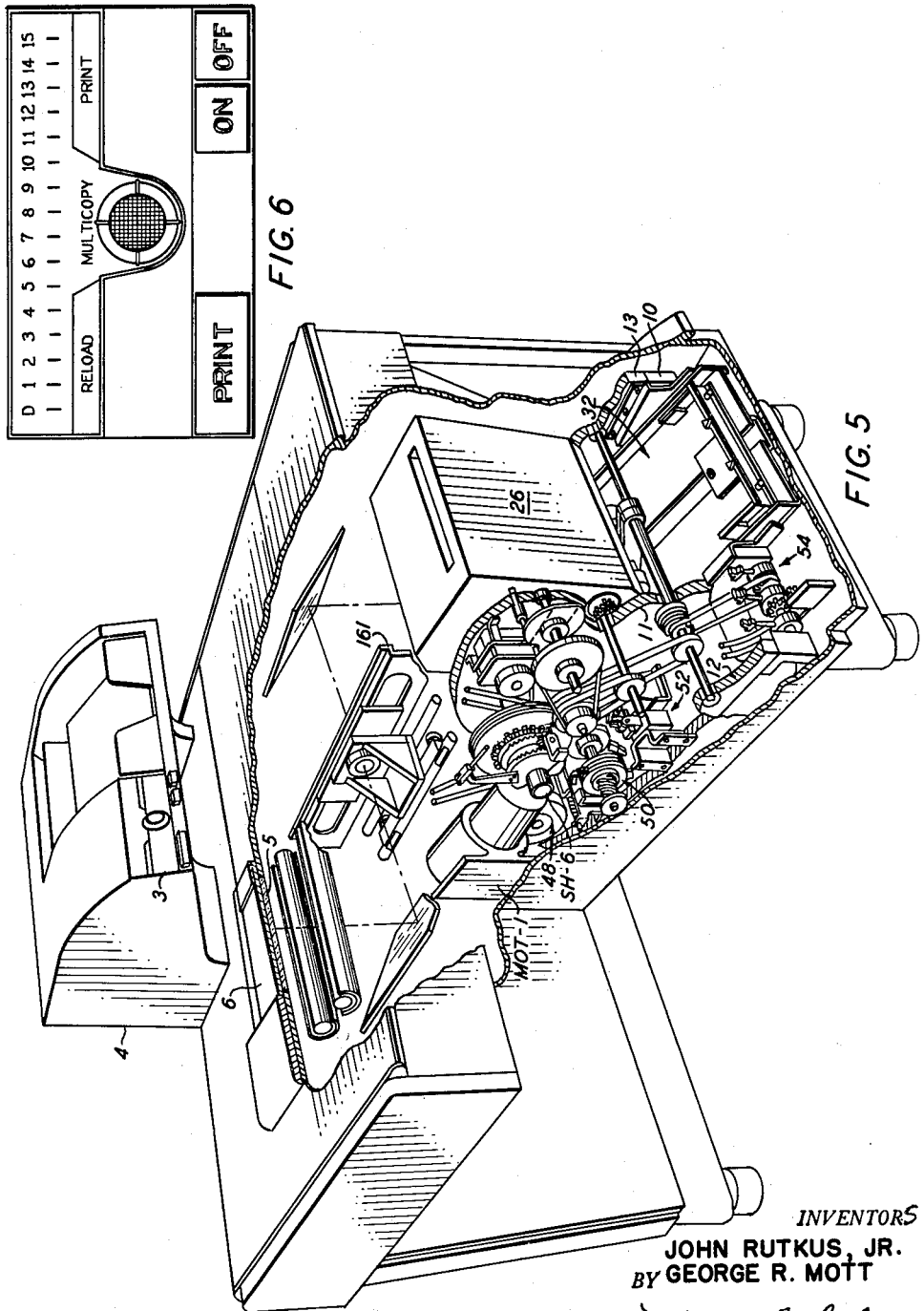
INVENTORS
JOHN RUTKUS, JR.
BY GEORGE R. MOTT
*Norman C. Schlieder*
ATTORNEY Nov. 6, 1962 J. RUTKUS, JR., ETAL 3,062,536
SHEET STRIPPING APPARATUS
Filed July 2, 1959 26 Sheets-Sheet 5

INVENTOR.
JOHN RUTKUS, JR.
GEORGE R. MOTT
BY
ATTORNEY

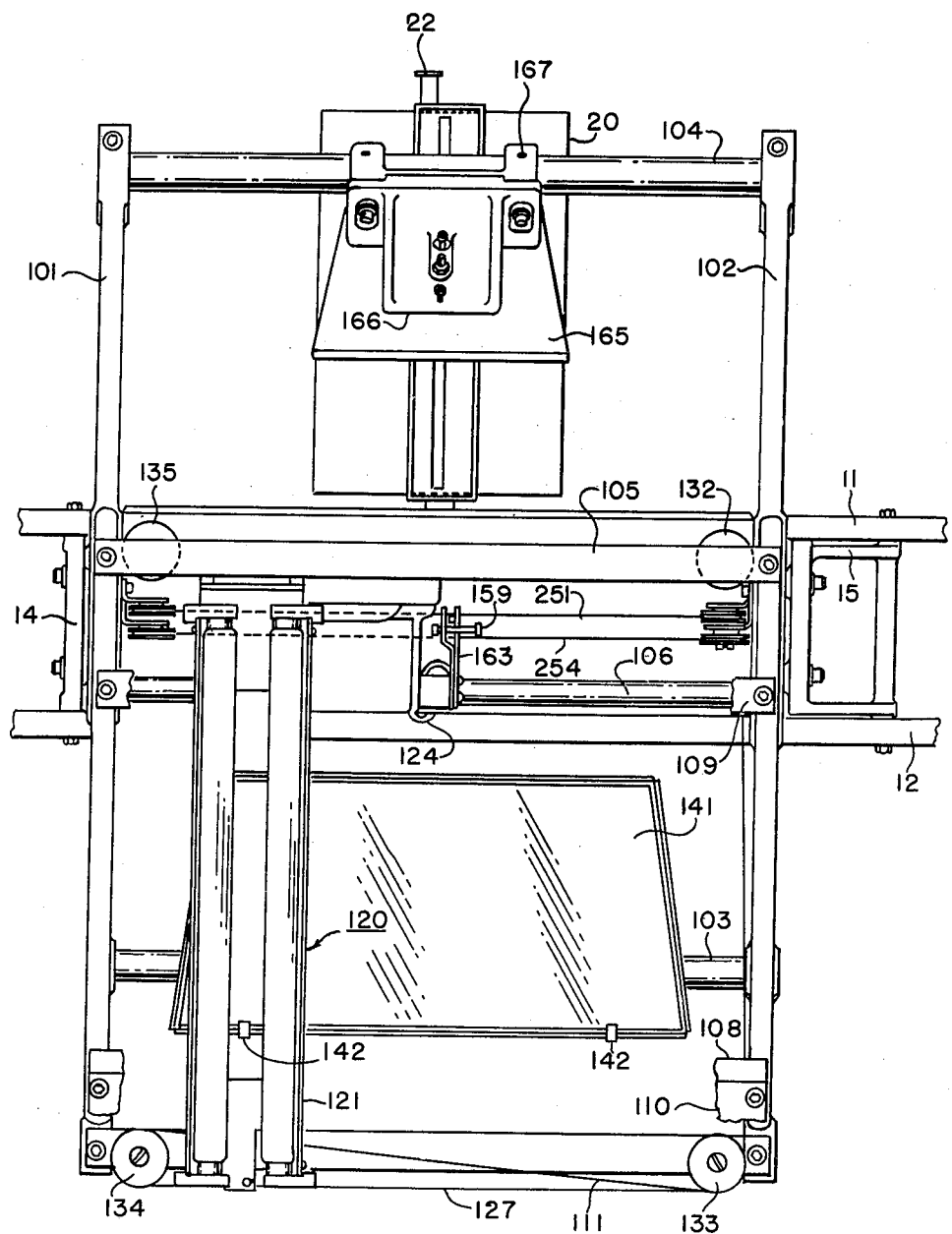

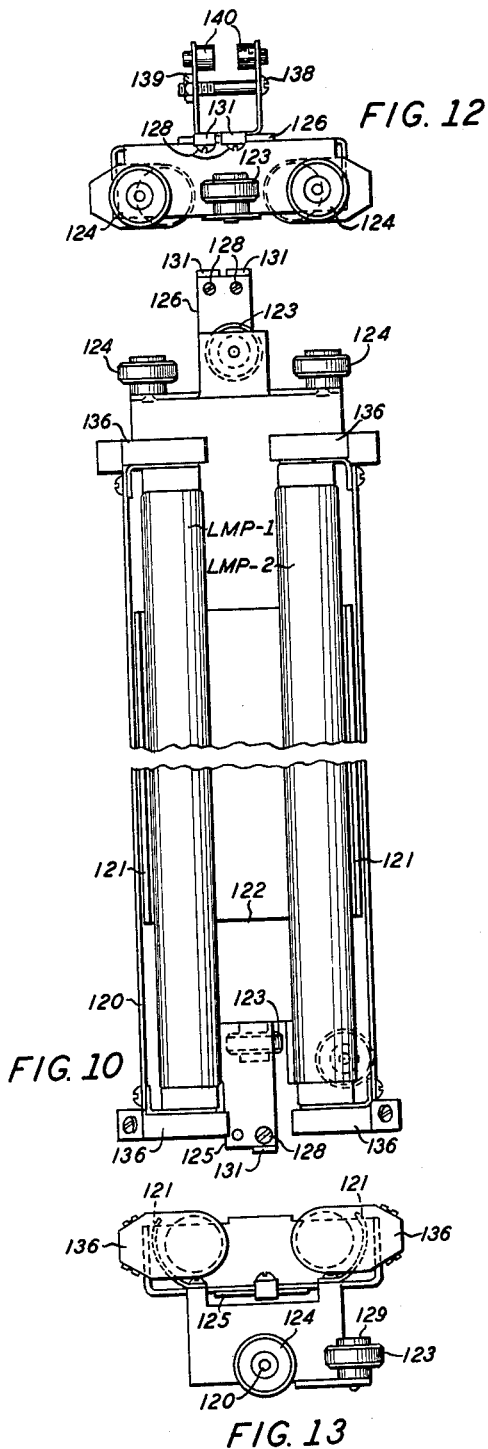
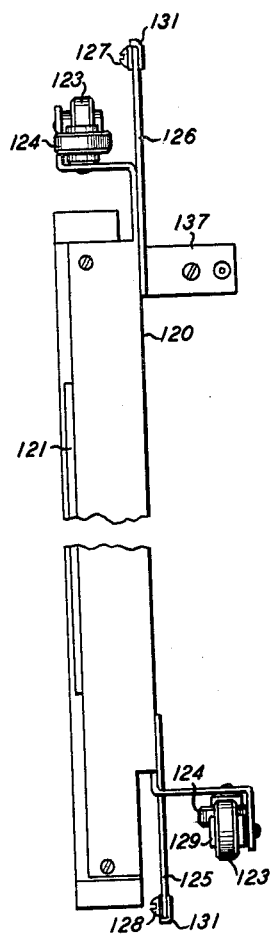

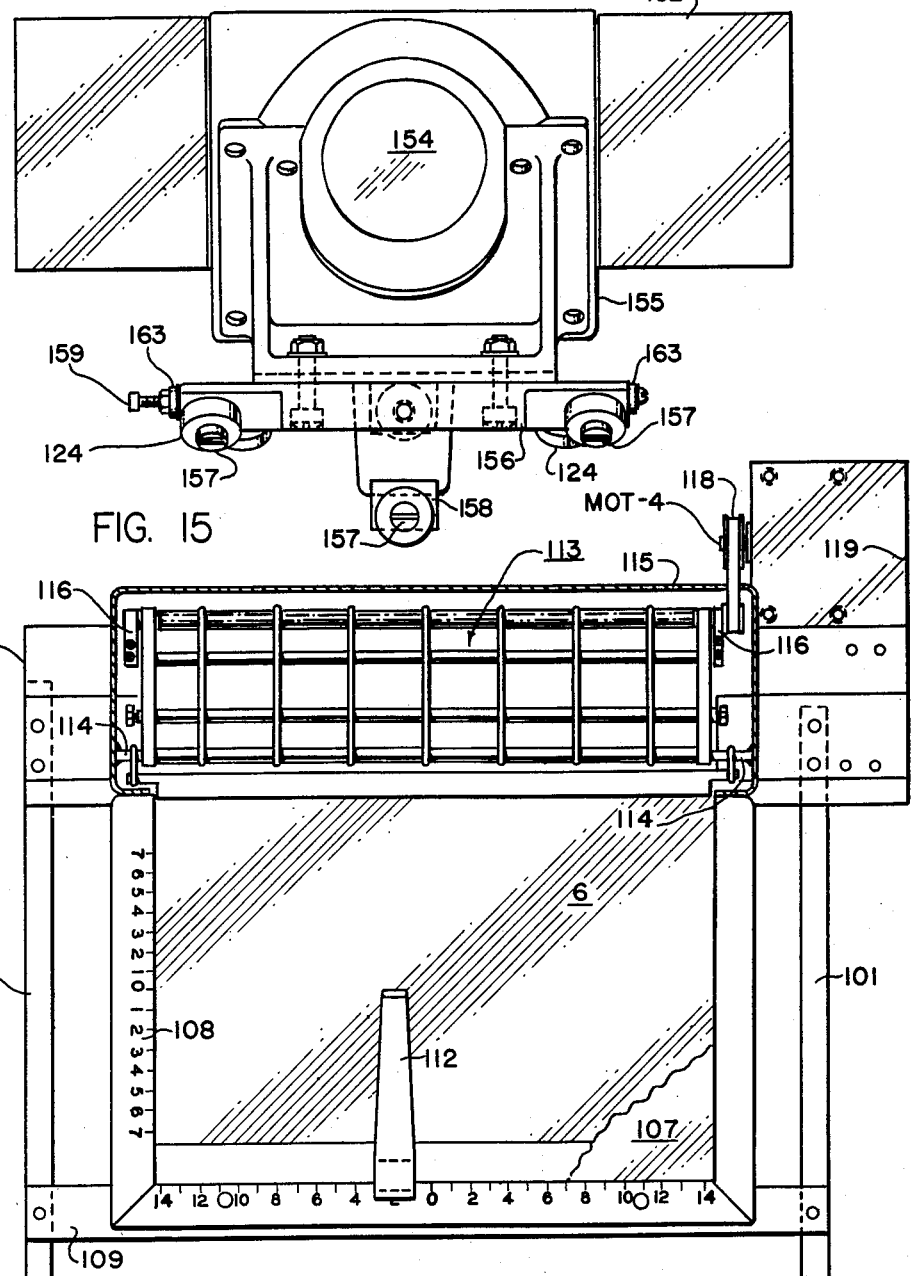

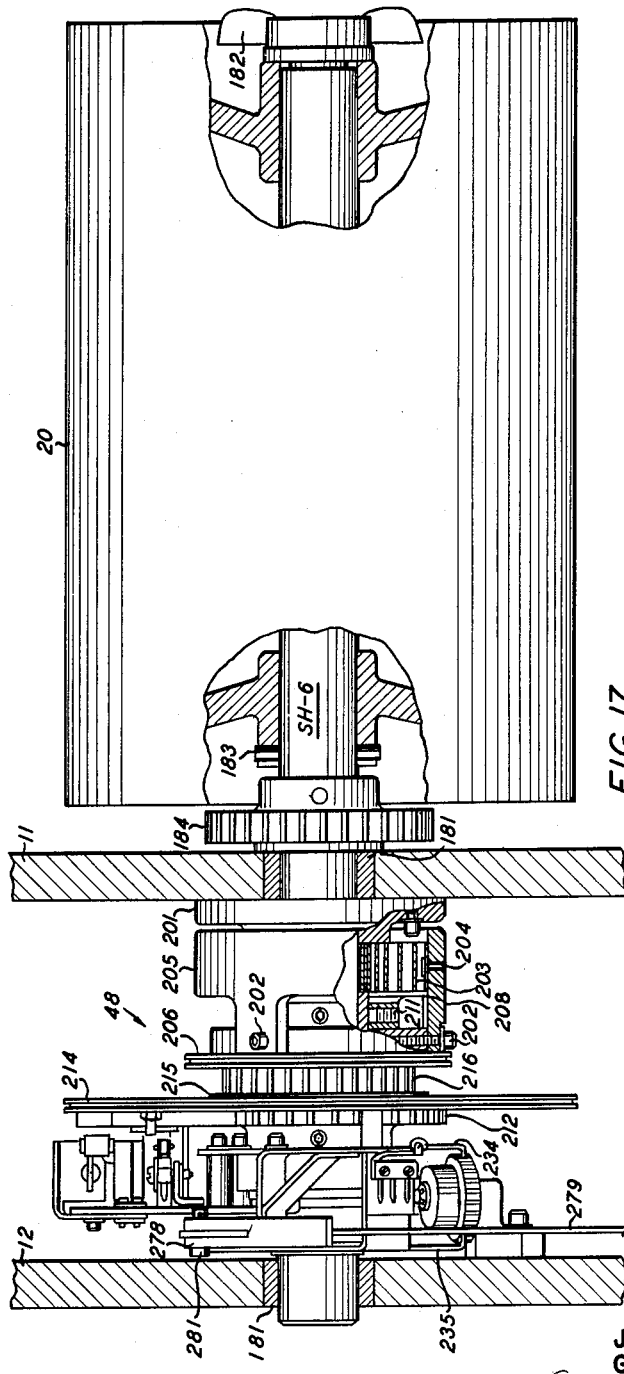

Nov. 6, 1962  J. RUTKUS, JR., ETAL  3,062,536
SHEET STRIPPING APPARATUS
Filed July 2, 1959  26 Sheets-Sheet 11

INVENTORS
JOHN RUTKUS, JR.
GEORGE R. MOTT
BY
ATTORNEY

INVENTORS
JOHN RUTKUS, JR.
GEORGE R. MOTT

Nov. 6, 1962  J. RUTKUS, JR., ET AL  3,062,536
SHEET STRIPPING APPARATUS
Filed July 2, 1959  26 Sheets-Sheet 13

INVENTORS
JOHN RUTKUS, JR.
GEORGE R. MOTT
BY
ATTORNEY

INVENTORS
JOHN RUTKUS, JR.
GEORGE R. MOTT
BY
ATTORNEY

Nov. 6, 1962  J. RUTKUS, JR., ETAL  3,062,536
SHEET STRIPPING APPARATUS
Filed July 2, 1959  26 Sheets-Sheet 15
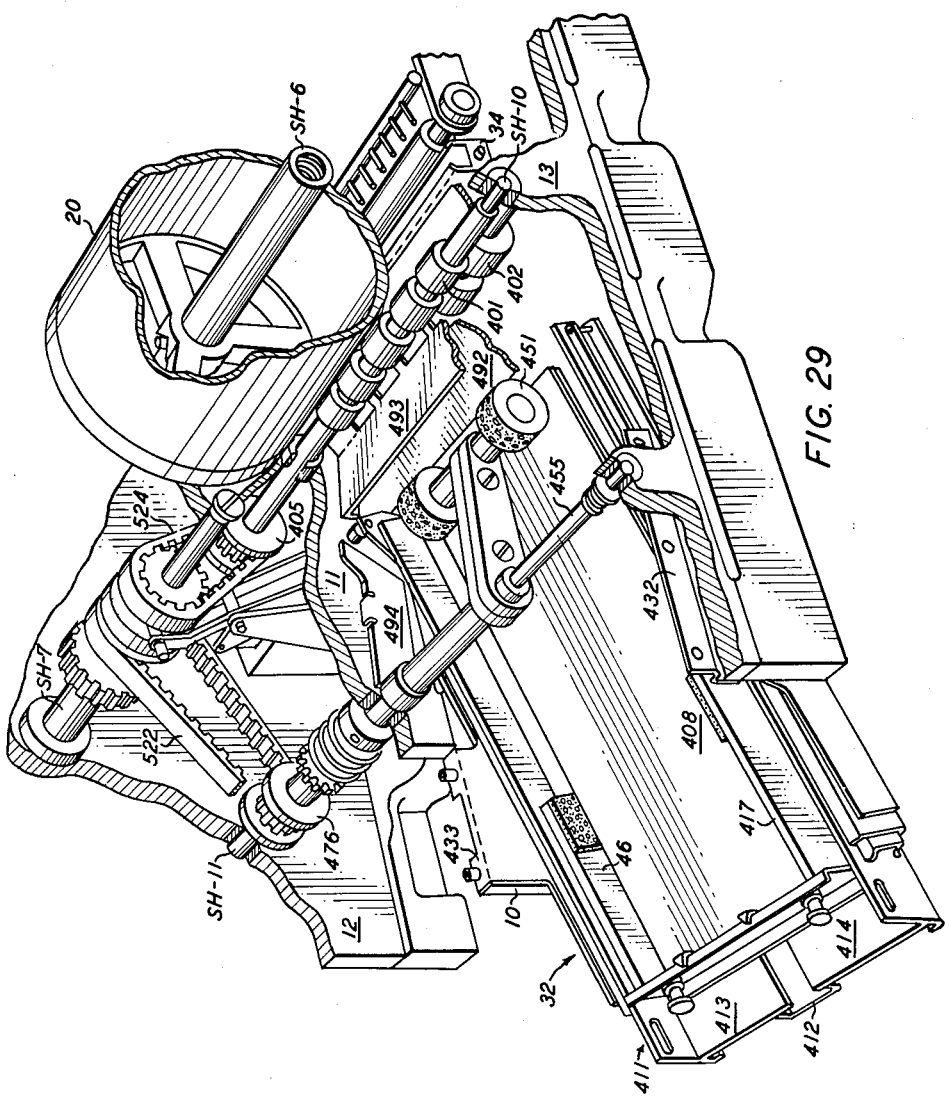
INVENTORS
JOHN RUTKUS, JR.
GEORG R. MOTT
BY
ATTORNEY

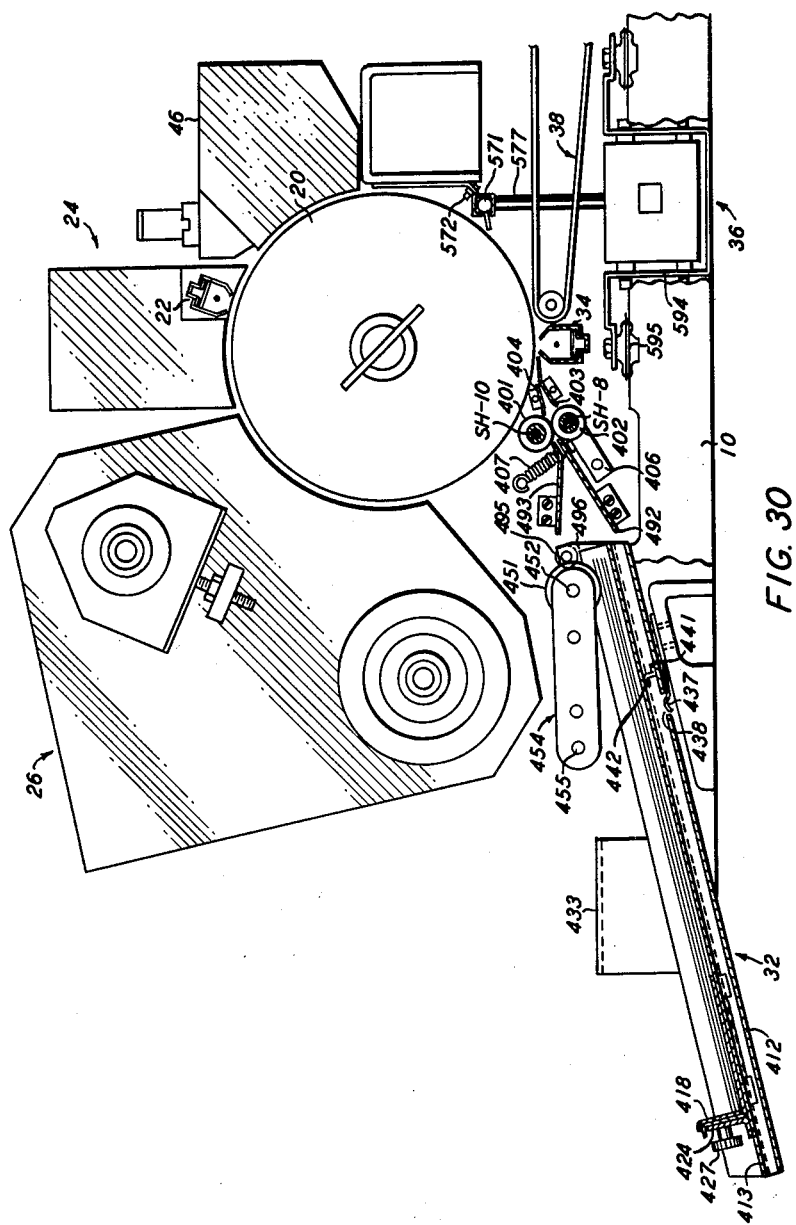

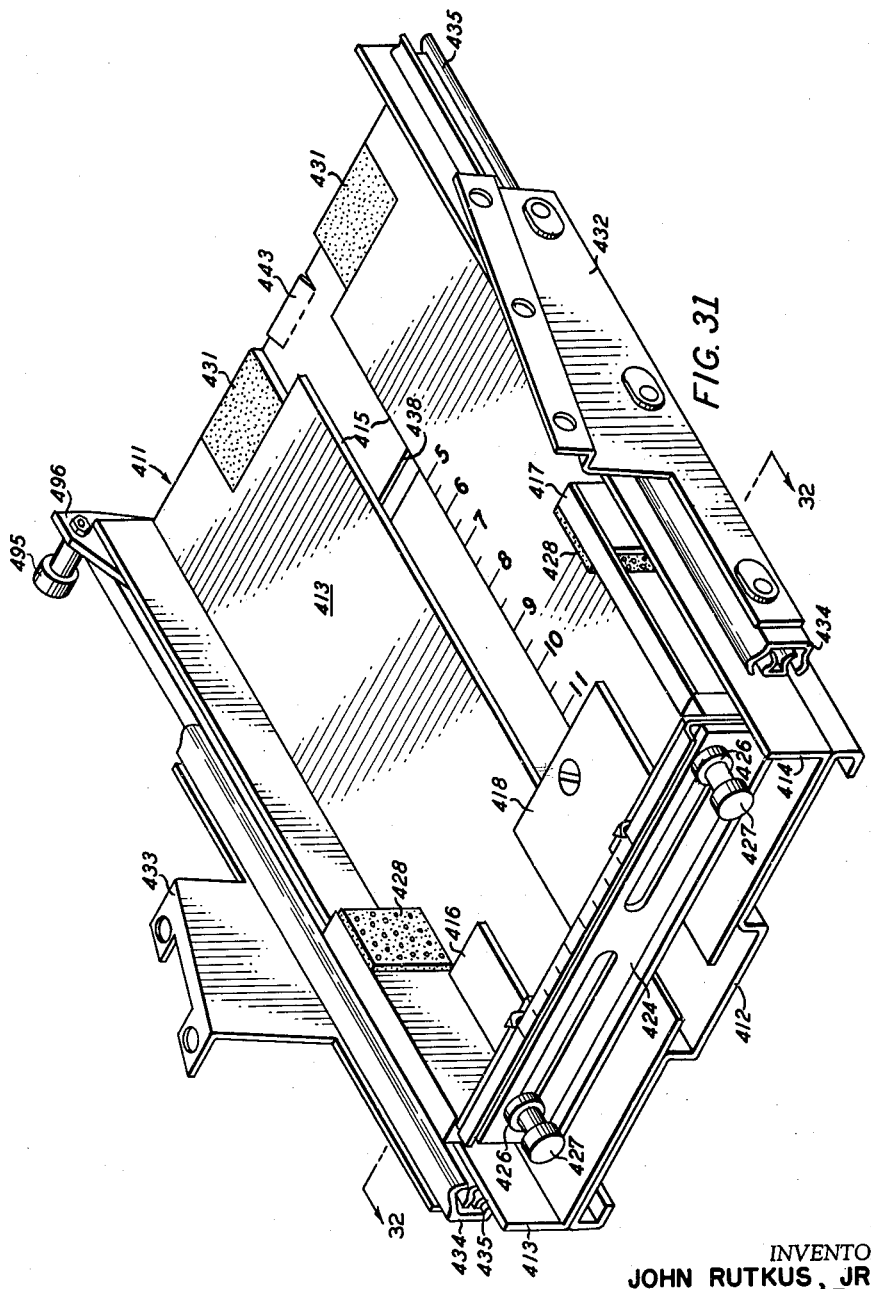

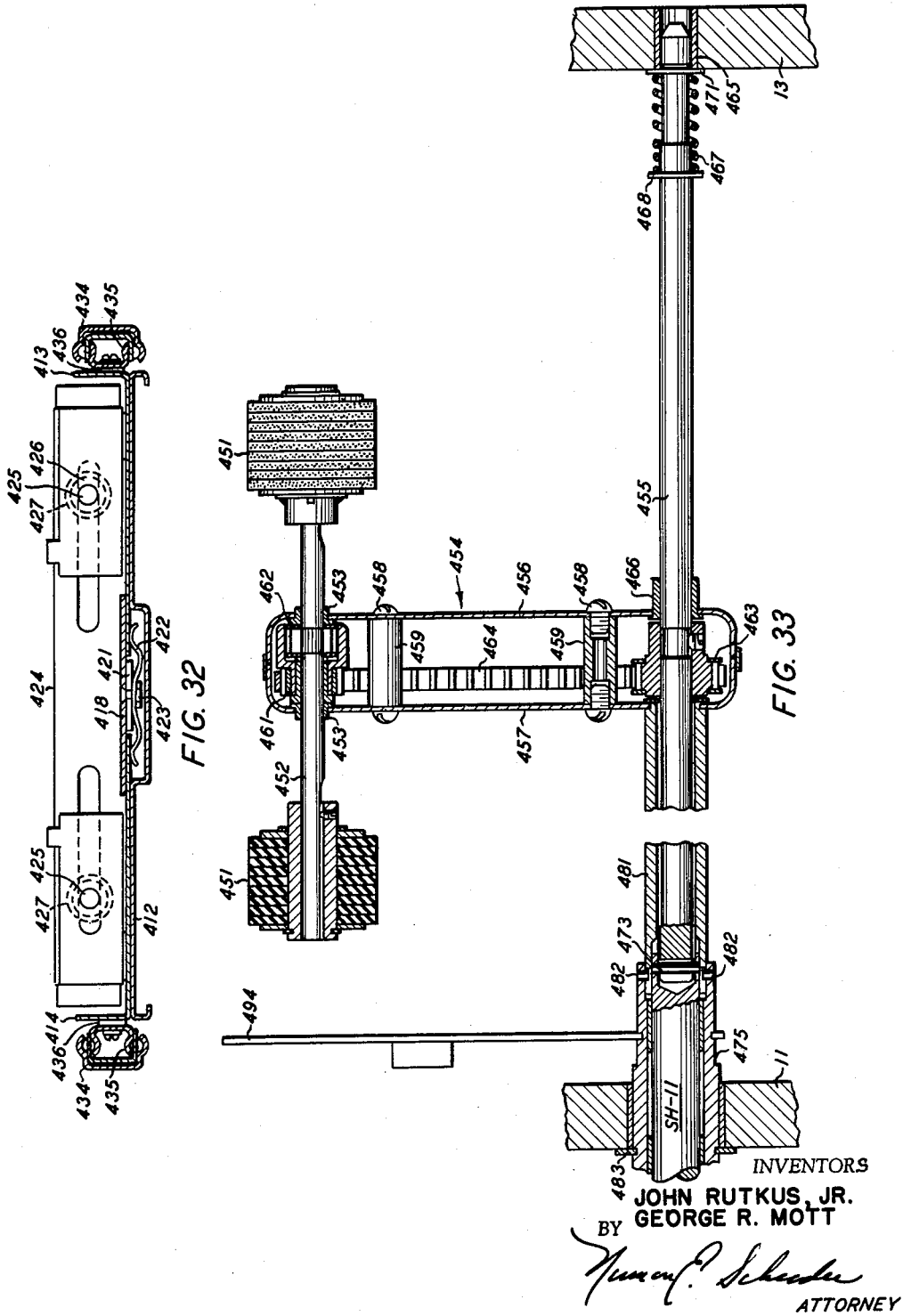

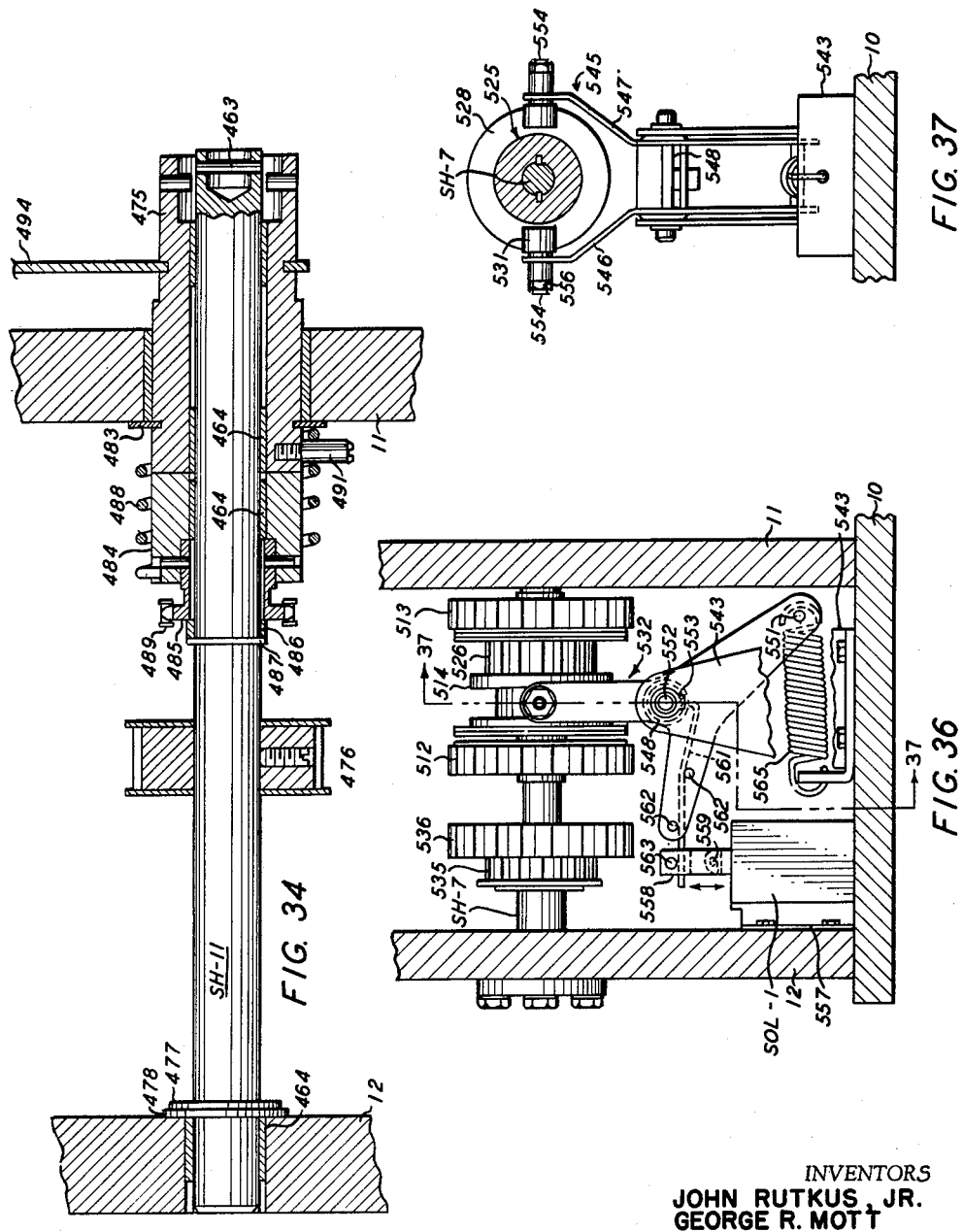

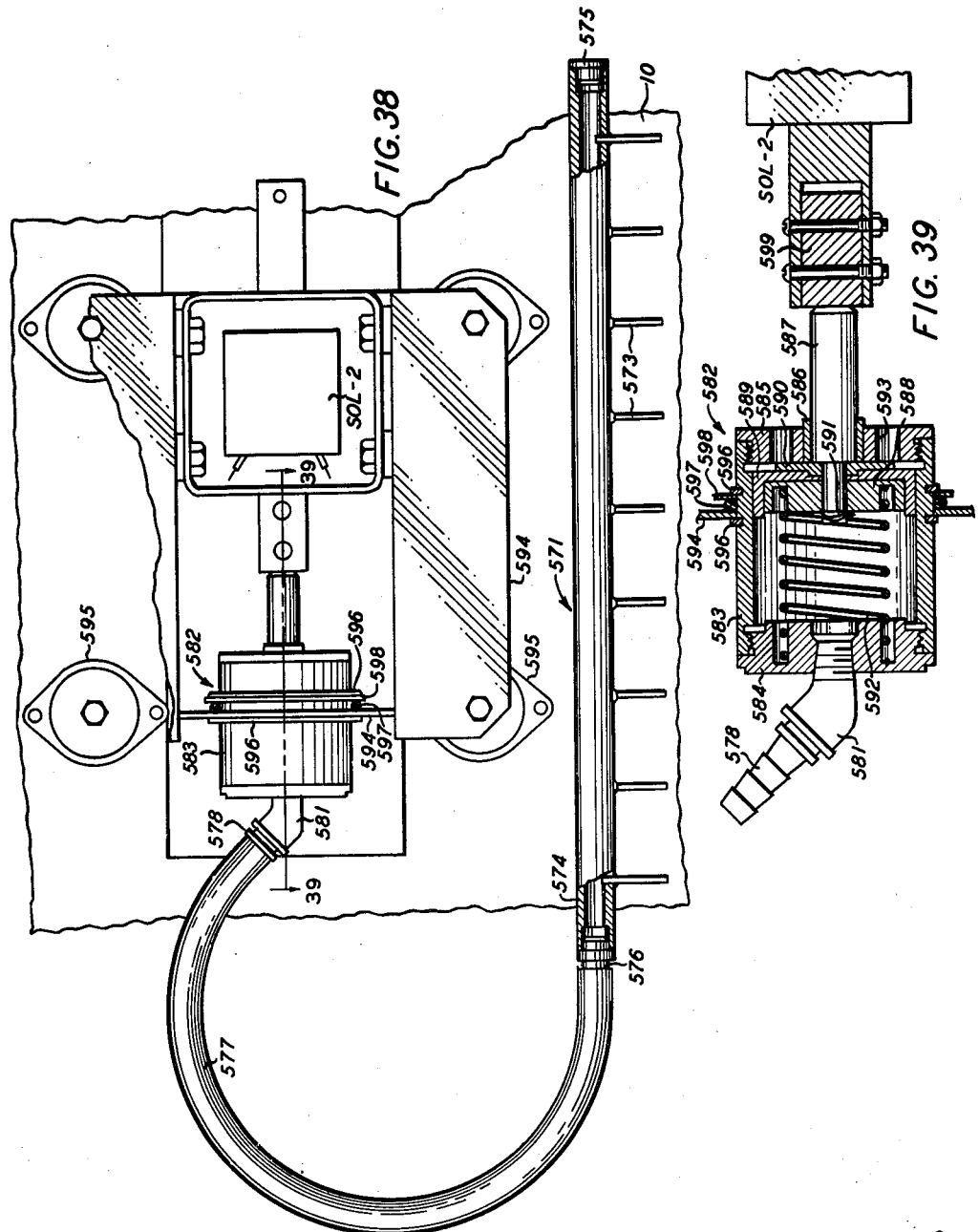

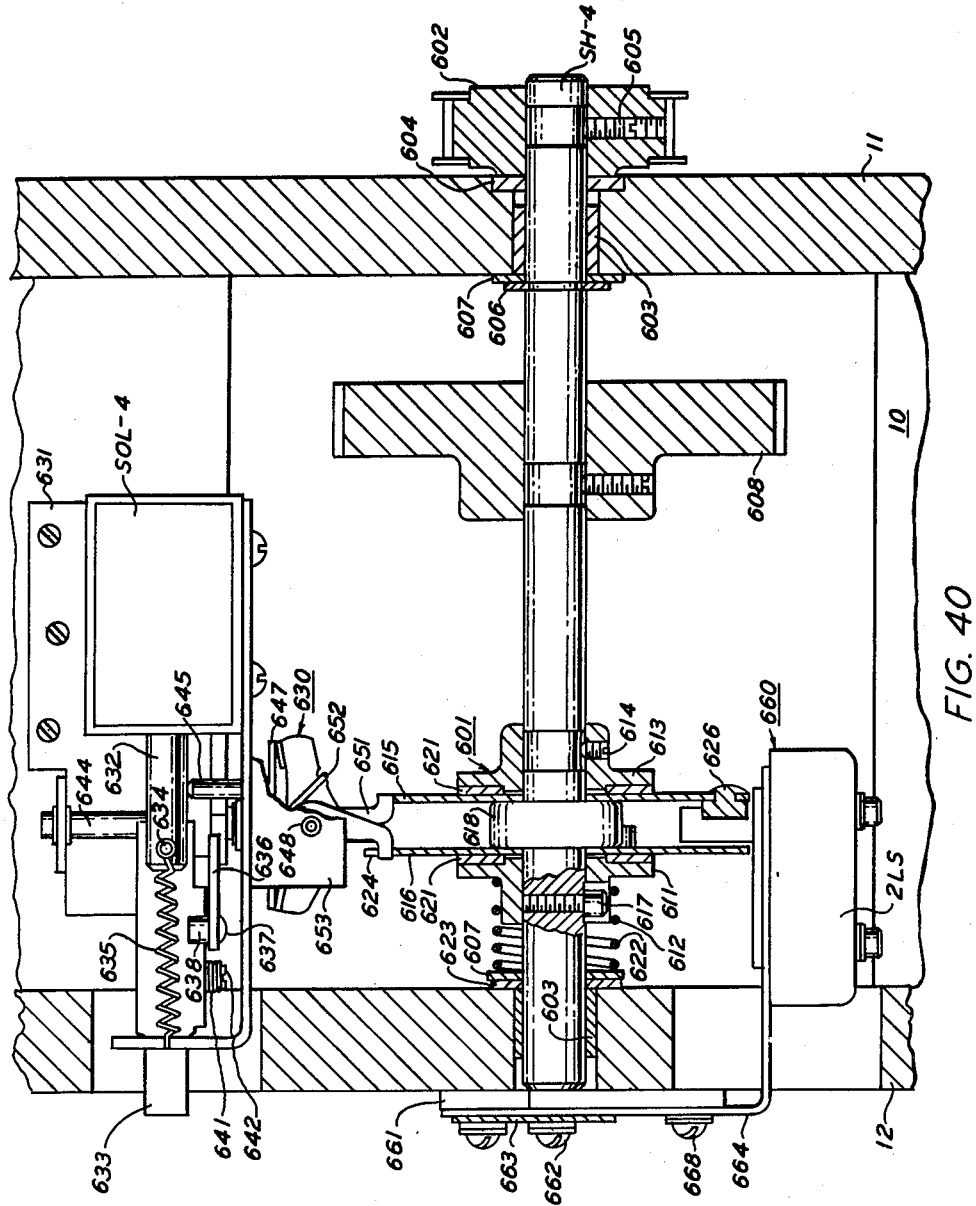

INVENTORS
JOHN RUTKUS, JR.
GEORGE R. MOTT
BY
ATTORNEY

FIG. 44

INVENTORS
JOHN RUTKUS, JR.
GEORGE R. MOTT
BY
ATTORNEY

INVENTORS
JOHN RUTKUS, JR.
GEORGE R. MOTT.
BY
ATTORNEY

United States Patent Office 3,062,536
Patented Nov. 6, 1962

3,062,536
SHEET STRIPPING APPARATUS
John Rutkus, Jr., Penfield, and George R. Mott, Rochester, N.Y., assignors to Xerox Corporation, a corporation of New York
Filed July 2, 1959, Ser. No. 824,658
3 Claims. (Cl. 271—63)

This invention relates in general to xerographic apparatus and, in particular, to a sheet stripping mechanism for removing sheets of transfer material from a xerographic plate.

More specifically, the invention relates to an improved sheet stripping apparatus utilizing jets of compressed aeriform fluid to strip a sheet of transfer material from a xerographic plate or similar device.

In the process of xerography, for example, as disclosed in either Carlson Patent 2,297,691, issued October 6, 1942, or in Carlson Patent 2,357,809, issued September 12, 1944, a xerographic plate, comprising a layer of photoconductive insulating material on a conductive backing, is given a uniform electric charge over its surface and is then exposed to the subject matter to be reproduced, usually by conventional projection techniques. This exposure discharges the plate areas in accordance with the radiation intensity which reaches them and thereby creates an electrostatic latent image on or in the plate coating.

Development of the image is effected with developer material or developers which comprise, in general, a mixture of a suitable pigmented or dyed electroscopic powder, hereinafter referred to as toner, and a granular carrier material, which latter functions to carry and to generate triboelectric charges on the toner. More exactly, the function of the granular material is to provide the mechanical control to the powder, or to carry the powder to an image surface and, simultaneously, to provide almost complete homogeneity of charge polarity. In the development of the image, the toner powder is brought into surface contact with the coating and is held thereon electrostatically in a pattern corresponding to the electrostatic latent image. Thereafter, the developed xerographic image is usually transferred to a support or transfer material to which it may be fixed by any suitable means.

The developed image is usually transferred to a transfer material or support material by means of a transfer mechanism which includes an ion source. The transfer material, for example, paper or other similar material, is placed in contact with the photoconductive surface of the xerographic plate carrying the xerographic image and the assembly of transfer material and plate is moved relative to an ion source, such as a corona wire, which is spaced a short distance from the transfer material. In this manner the xerographic image is electrostatically transferred from the surface of the xerographic plate to the transfer material. As a result of this process, the transfer material adheres electrostatically to the xerographic plate.

In prior art devices, mechanical strip fingers of the type commonly used in the printing art, have been used as a means for stripping the transfer material from a xerographic plate. Since mechanical strip fingers, in order to strip a sheet of transfer material from a xerographic plate, must be inserted between the transfer material and the surface of the xerographic plate, they will inadvertently graze the photoconductive surface of the xerographic plate, thereby marring this surface. Also during this process as the transfer material is peeled from the xerographic plate by the strip fingers, the surface of the transfer material carrying the transferred images will slide on the strip fingers, and since xerographic image at this time is held on the transfer material by electrostatic force only, the image areas brushing across the surface of the strip fingers will be disfigured.

It is therefore an object of this invention to improve sheet stripping apparatus for removing electrostatically adhering transfer material from a xerographic plate without incurring harm to the photoconductive surface of the xerographic plate and without disfiguration of an electrostatically adhering xerographic image on the transfer material.

Another object of this invention to is improve sheet stripping apparatus for removing sheet transfer material, such as paper or similar material from a printing drum or similar apparatus with no structural element contacting either the transfer material or the printing drum.

These and other objects of the invention are attained by means of a pneumatic sheet stripping apparatus including a pulsator as a cyclic source of compressed aeriform fluid connected to a discharge manifold having multiple parallel spaced discharge nozzles adapted to be positioned adjacent a xerographic plate or similar device, carrying a sheet of transfer material adhering thereto whereby jets of compressed aeriform fluid may be directed by said discharge nozzle against the xerographic plate to separate the leading edge of a sheet of transfer material from the xerographic plate.

For a better understanding of the invention as well as other objects and further features thereof, reference is had to the following detailed description of the invention to be read in connection with the accompanying drawings, wherein:

FIG. 5 is a left-hand perspective view of the xerographic apparatus with parts of the desk covering broken away to show the arrangement of the xerographic machine elements;

FIG. 6 is a view of the main control panel of the apparatus mounted on the super-structure of the desk;

FIG. 8 is a top view of the optical apparatus with the copy board and platen cover removed;

FIG. 10 is a top view of the movable lamp assembly of the optical system;

FIG. 11 is a front view of the movable lamp assembly of FIG. 10;

FIG. 12 is a right-hand view of the movable lamp assembly of FIG. 10;

FIG. 13 is a left-hand view of the movable lamp assembly of FIG. 10;

FIG. 15 is a right-hand view of the lens assembly of the optical system;

FIG. 16 is a top view of the copy board and platen cover of the apparatus removed from the machine;

FIG. 17 is a top view partly in section of the xerographic drum and scan control mechanism of the apparatus;

FIG. 29 is a right-hand perspective view, partly in section, of the paper feed mechanism of the apparatus;

FIG. 30 is a side sectional view of the image transfer station of the xerographic apparatus and associated elements;

FIG. 31 is a right-hand perspective view of the paper feed tray;

FIG. 32 is a sectional view of the paper feed tray taken along line 32—32 of FIG. 31;

FIG. 33 is a sectional view of the paper separator roller and associated elements;

FIG. 34 is a sectional view of the paper separator roller drive and tensioning elements;

FIG. 36 is a front view of the clutch mechanism of the paper feed system;

FIG. 37 is a sectional view taken along line 37—37 of FIG. 36;

FIG. 38 is a top view, from the left, of the paper pick-off mechanism;

FIG. 39 is a sectional view taken along line 39—39 of FIG. 38;

FIG. 40 is a top view, partly in section, of the programmer mechanism;

Figure 44:
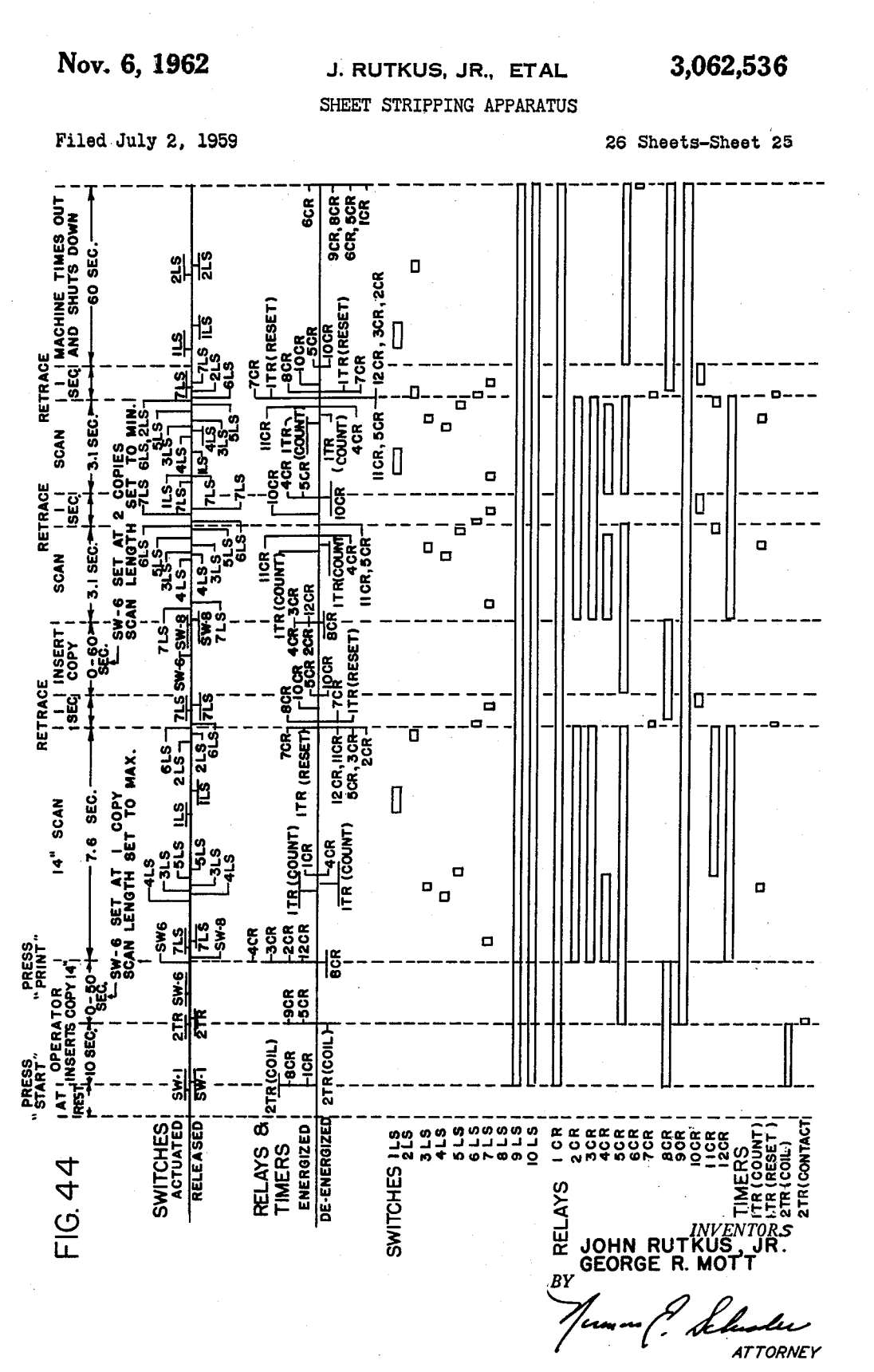

FIG. 44 is a timing chart of the operation of the switches, relays and timers of the electrical circuit of FIG. 43.

Figure 1:
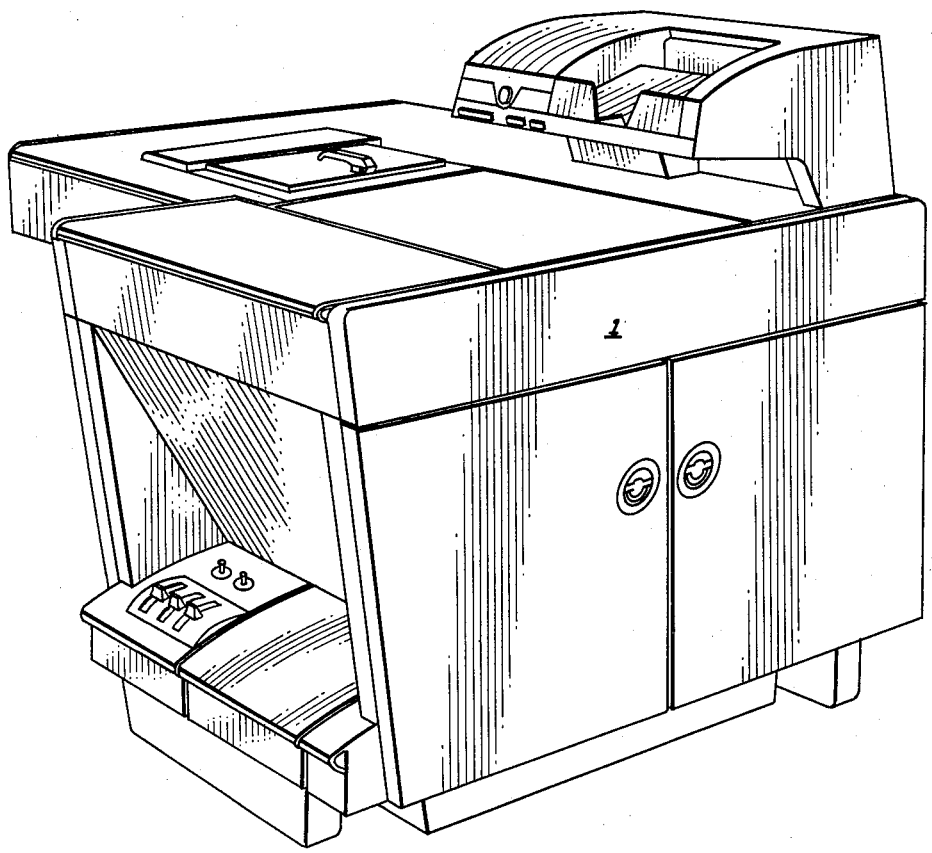
FIG. 1 is a right-hand perspective view of a xerographic apparatus incorporating an optical scanning mechanism, in accordance with the invention.

Referring now to the drawings, there is shown in FIG. 1 a xerographic processing machine used for producing xerographic reproductions from a stationary original, the original being either transparent, translucent or opaque copy, whether in the form of single sheets, books, or in three-dimensional form. To conform to modern office decor the xerographic apparatus of the invention is adapted for installation in a suitable desk, constructed so that an operator seated at the desk may conveniently control all operations of the apparatus.

The desk, generally designated 1, constructed in a conventional manner, has mounted on the top and in the right-hand corner thereof a main control panel for initiating operation of the machine and for selecting and indicating the number of reproductions to be made, and a collecting tray for finished reproductions, usually made on paper. Although the reproductions may be discharged from the copier-duplicator for collection at any point accessible externally of the machine, it is preferred that the discharge terminal of the reproduction or paper feed means be embodied in a super-structure 4 overhanging the rear portion of the desk top, said super-structure also housing the main control panel 3 of the apparatus. Thus the document holder or copyboard 5 and its covering platen 6 can be left unobstructed at the front part of the desk over the knee space.

In the lower right-hand corner of the desk is a second control panel 7 for additional control circuits and for levers to control the length of scan, to control the tensions of the paper separator rollers on a stack of paper to adjust for different paper weights, and for controlling the toner dispensing rate, all of which is described in detail hereinafter.

Figure 2:
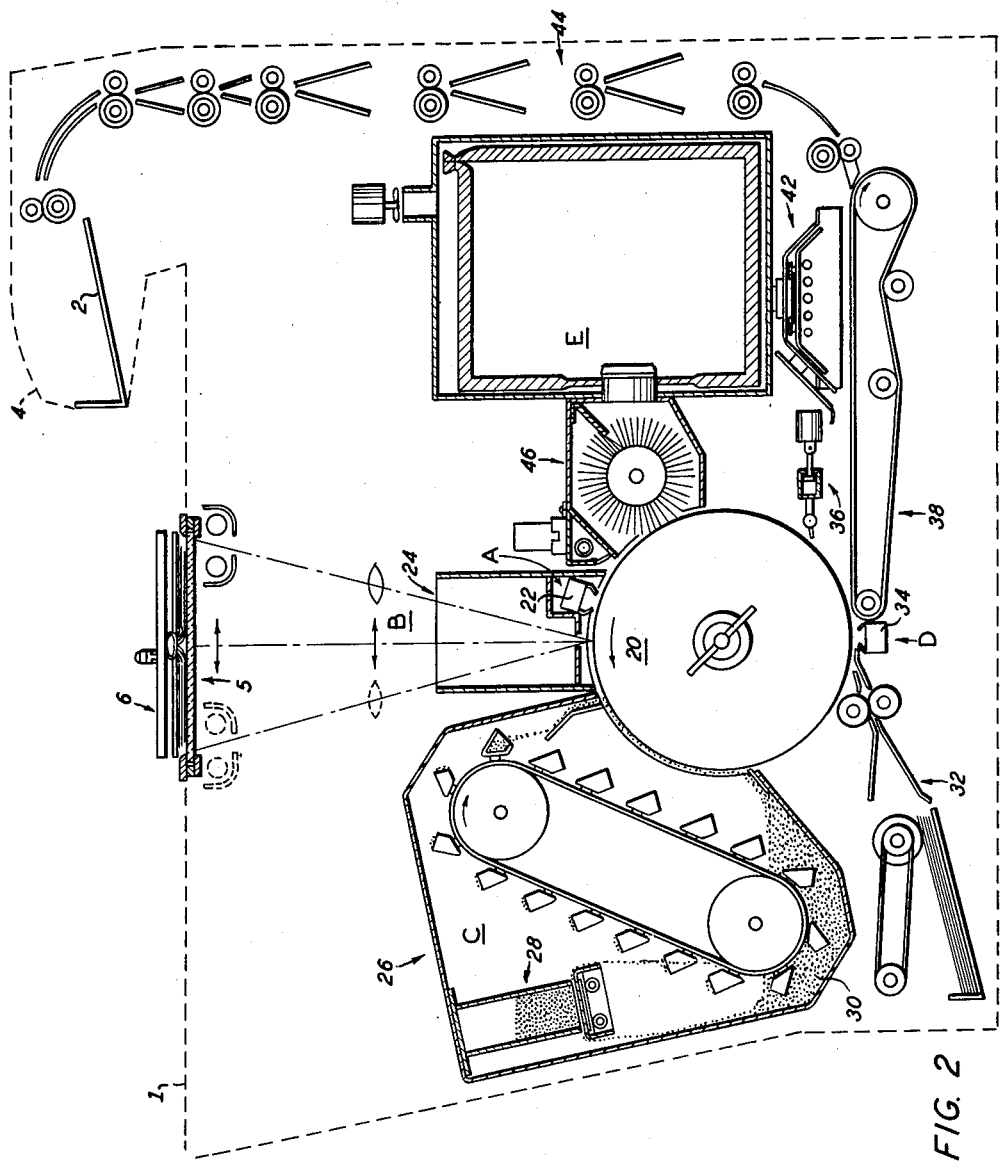
FIG. 2 illustrates schematically a preferred embodiment of a xerographic apparatus adapted for continuous and automatic operation and incorporating an optical scanning mechanism.

As shown schematically in FIG. 2, the xerographic apparatus comprises a xerographic plate including a photoconductive layer or light-receiving surface on a conductive backing and formed in the shape of a drum, generally designated by numeral 20, which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powder image in the configuration of the copy to be reproduced;

A transfer station, at which the xerographic powder image is electrostatically transferred from the drum surface to a transfer material or support surface; and A drum cleaning and discharge station, at which the drum surface is brushed to remove residual toner particles remaining thereon after image transfer, and at which the drum surface is exposed to a relatively bright light source to effect substantially complete discharge of any residual electrostatic charge remaining thereon.

The charging station is preferably located as indicated by reference character A. In general, the charging apparatus or corona charging device 22 includes a corona discharge array of one or more corona discharge electrodes that extend transversely across the drum surface and are energized from a high potential source and are substantially enclosed within a shielding member.

Next subsequent thereto in the path of motion of the xerographic drum is an exposure station B. This exposure station may be one of a number of types of mechanisms or members such as desirably an optical scanning or projection system or the like designed to project a line copy image onto the surface of the photoconductive xerographic drum from a stationary original. To permit substantially any type of original copy, including books, magazines and other types of cumbersome three-dimensional objects to be copied for the reproduction of specific information contained thereon, the optical projection system shown is of the type disclosed in copending Mayo application, Serial No. 783,388, filed December 29, 1958.

The optical scanning or projection assembly, generally designated 24, comprises a stationary copyboard which may consist of a transparent plate member such as, for example, a glass plate or the like positioned parallel to the top of the desk, which is adapted to support a master or original, such as book 18 placed face downward on its upper surface, the copyboard being uniformly illuminated and arranged in light-projecting relation to the moving light-receiving surface of the xerographic drum 20. Uniform lighting is provided by a pair of lamps attached to a slotted light reflector mounted for movement to traverse the plane of the copyboard.

A light shield adapted to protect the xerographic drum from extraneous light is positioned adjacent to the surface of the xerographic drum. A slot aperture in the light shield extends transversely to the path of movement of the light-receiving surface of the xerographic drum 20 to permit reflected rays from the copyboard to be directed against a limited transverse area of the light-receiving surface as it passes therebeneath. As shown, the light shield also encloses the corona charging device 22.

To enable the optical system to be enclosed within a conventional-size desk, a folded optical system including an object mirror, a lens, and an image mirror is used in the preferred embodiment of the invention.

The lens element positioned between the copyboard and the lgiht shield is arranged for movement in a path to traverse the plane of the copyboard in timed relation to the movement of the light source, whereby the subject image of the original supported by the copyboard is scanned in timed relation to the movement of the light-receiving surface of the xerographic drum to project a light image corresponding to the subject image onto the surface of the xerographic drum.

Adjacent to the exposure station is a developing station C in which there is positioned a developer apparatus 26 including a casing or housing having a lower or sump portion for accumulating developing material 30. A bucket-type coveyor having a suitable driving means, is used to carry the developing material to the upper part of the developer housing where it is cascaded down over a hopper chute onto the xerographic drum.

As the developing material is cascaded over the xerographic drum, toner particles are pulled away from the carrier component of the developing material and deposited on the drum to form powder images, while the partially denuded carrier particles pass off the drum into the developer housing sump. As toner powder images are formed, additional toner particles must be supplied to the developing material in proportion to the amount of toner deposited on the drum. For this purpose, a toner dispenser generally designated 28 of the type disclosed in copending Hunt application, Serial No. 776,976, filed November 28, 1958, now U.S. Patent No. 3,013,703, is used to accurately meter toner to the developing material.

Positioned next and adjacent to the developing station is the image transfer station D which includes suitable sheet feeding mechanism adapted to feed sheets of paper successively to the xerographic drum in coordination with the presentation of the developed image on the drum at the transfer station. This sheet feeding mechanism, generally designated 32, includes a sheet source such as a tray for a plurality of sheets of a suitable transfer material that is, typically, sheets of paper or the like, a separating roller adapted to feed the top sheet of the stack to feed rollers which direct the sheet material into contact with the rotating drum at a speed preferably slightly in excess of the rate of travel of the surface of the drum in coordination with the appearance of the developed image at the transfer station. In this manner, the sheet material is introduced between the feed rollers and is thereby brought into contact with the rotating drum at the correct time and position to register with the developed image. To effect proper registration of the sheet transfer material with the feed rollers and to direct the sheet transfer material into contact with the drum, guides are positioned on opposite sides of the feed rollers.

The transfer of the xerographic powder image from the drum surface to the transfer material is effected by means of a corona transfer device 34 that is located at or immediately after the point of contact between the transfer material and the rotating drum. The corona transfer device 34 is substantially similar to the corona discharge device that is employed at charging station A in that it includes an array of one or more corona discharge electrodes that are energized from a suitable high potential source and extend transversely across the drum surface and are substantially enclosed within a shielding member. In operation, the electrostatic field created by the corona discharge device is effective to tack the transfer material electrostatically to the drum surface, whereby the transfer material moves synchronously with the drum while in contact therewith. Simultaneously with the tacking action, the electrostatic field is effective to attract the toner particles comprising the xerographic powder image from the drum surface and cause them to adhere electrostatically to the surface of the transfer material.

Immediately subsequent to the image transfer station is positioned a transfer material stripping apparatus or paper pickoff mechanism, generally designated 36, for removing the transfer material from the drum surface. This device includes a plurality of small diameter, multiple outlet conduits of a manifold that is supplied with pressurized aeriform fluid by a pulsator operated by a suitable power means. The pulsator is adapted to force jets of pressurized aeriform fluid through the outlet conduits into contact with the surface of the drum slightly in advance of the sheet material to strip the leading edge of the sheet material from the drum surface and to direct it onto an endless conveyor 38 whereby the sheet material is carried to a fixing device, such as, for example, heat fuser 42, whereby the developed and transferred xerographic powder image on the sheet material is permanently fixed thereto.

After fusing, the finished copy is preferably discharged from the apparatus at a suitable point for collection externally of the apparatus. To accomplish this there is provided a vertical conveyor, generally designated 44, by means of which the copy is delivered to a copy holder positioned in a suitable super-structure overhanging the rear portion of the desk top.

The next and final station in the device is a drum cleaning station E, having positioned therein a drum cleaning device 46 adapted to remove any powder remaining on the xerographic drum after transfer by means of a rotating brush and whereby the xerographic drum is flooded with light to cause dissipation of any residual electrical charge remaining on the xerographic drum.

To remove residual powder from the xerographic drum there is disposed a cylindrical brush rotatively mounted on an axle. For collecting powder particles removed from the xerographic drum by the brush there is provided a dust hood that is formed to encompass approximately two-thirds of the brush area. To insure thorough cleaning of the brush a flicking bar is preferably secured to the interior of the dust hood adjacent the edge of the exhaust duct and in interfering relation with the ends of the brush bristles whereby dust particles may be dislodged therefrom.

For removing dust particles from the brush and dust hood, an exhaust duct is arranged to cover a slot that extends transversely across the dust hood and is connected to a filter bag in the filter box. A motor-fan unit, connected to the filter box, produces a flow of air through the filter box drawing air through the area surrounding the xerographic drum and the dust hood, the air entraining powder particles removed from the drum by the brush as the air flows through the dust hood. Powder particles are separated from the air as it flows through the filter bag so that only clean air reaches the motor-fan unit.

Any residual electrical charge remaining on the xerographic drum is dissipated by light from a fluorescent lamp mounted in a suitable lamp housing hinged to the dust hood, a starter being provided for energizing the fluorescent lamp.

Suitable drive means described hereinafter drive the drum, lens element, and slotted light reflector at predetermined speeds relative to each other and included are means to return the lens element and the slotted light reflector to their respective traverse starting positions and means to effect operation of the bucket-type conveyor, toner dispenser, endless conveyor, vertical conveyor; the separating roller and feed rollers being controlled in a manner to permit the feed of a sheet of transfer material into registered impression contact with the developed image on the xerographic drum as it is rotated through the transfer station. Stated in a different manner, a sheet of transfer material is advanced in time relation to the start of scan of the leading edge of a copy.

Figure 3:
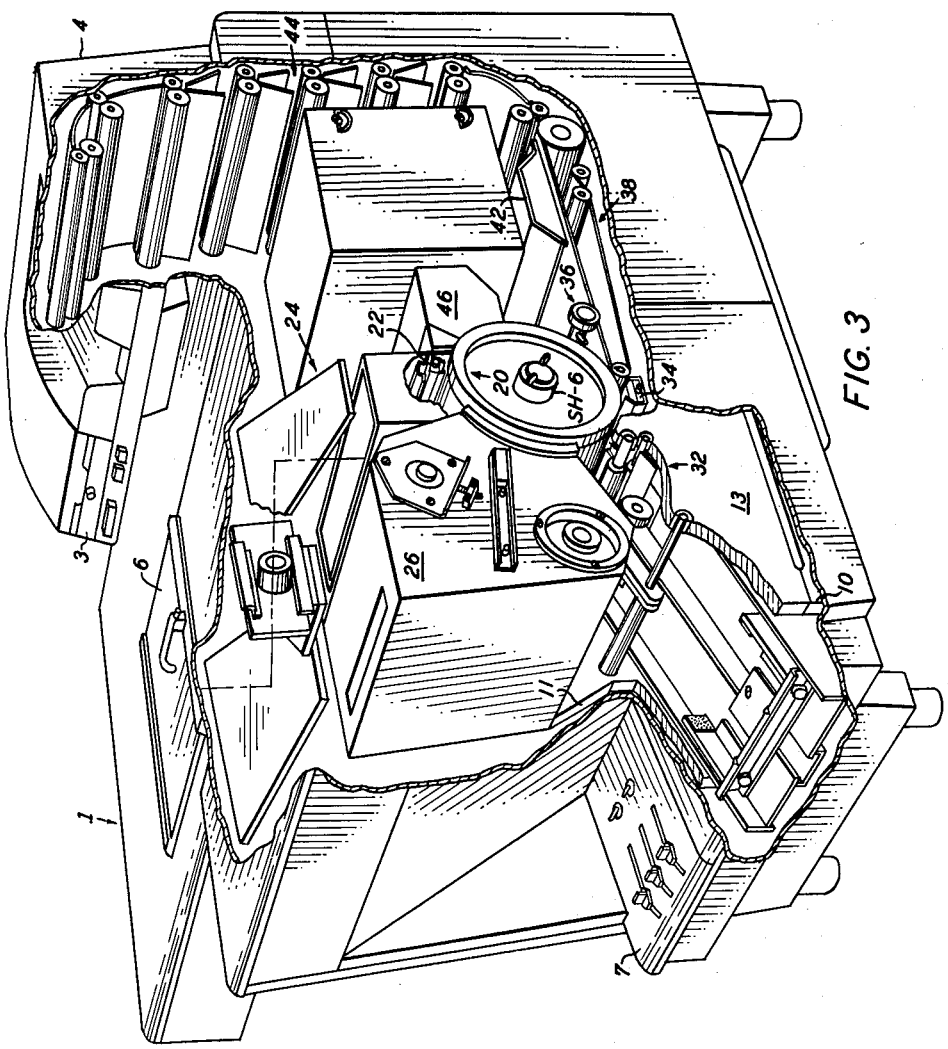
FIG. 3 is a right-hand perspective view of the xerographic apparatus of the invention with parts of the desk covering broken away to show the arrangement of the xerographic machine elements.

Referring now to FIGS. 3 and 5 there is shown the general arrangement of the xerographic apparatus within the desk 1. As shown, there is provided a frame for supporting the components of the apparatus formed by a base plate 10 to which are mounted full front and rear plates 11 and 12, respectively, and partial plate 13. The plates are connected together and maintained rigidly in spaced relation to each other by suitable tie plates such as tie plates 14 and 15.

As shown in FIG. 3, the xerographic drum 20 is mounted on horizontal driven shaft SH6 and the drum is positioned on the exposed front face of front plate 11, with the major xerographic components of the machine mounted around the drum either on the exposed front face of plate 11 or between plate 11 and partial plate 13.

The main drive elements and controls for the xerographic components are mounted between front and rear plates 11 and 12, respectively, as shown in FIG. 5, and they include as major components thereof, a main drive motor MOT1, a scan control mechanism 48 for operating the movable elements of the optical system 24, a programmer 50 for actuating the operation of the paper feed system 32 and paper pickoff mechanism 36, a clutch mechanism 52 for effecting alternate operation of the separator and feed rollers in the paper feed system, and a lever control system 54 for adjusting the length of scan, toner dispensing rate, and separator roller tension.

It is believed that the foregoing description is sufficient for the purposes of this application to show the general operation of the xerographic apparatus. For further details concerning its specific construction, reference is made to copending Mayo et al. application, Serial No. 824,500, filed concurrently herewith on July 2, 1959, and to portions of this specification wherein specific elements cooperating with the pneumatic sheet stripping apparatus are illustrated and described although they form no part of the instant invention.

Specifically referring to FIGS. 7 through 16 in particular, the optical scanning assembly 24 used to project an image from a stationary object to the photoconductive surface of the xerographic drum includes optical side plates 101 and 102 which may be formed integrally with the main frame or, optionally, as shown, may be formed as separate plates bolted or otherwise secured to tie plates 14 and 15 of the main frame. Optical side plates 101 and 102 are connected together in fixed parallel relation to each by object support rod 103, image support rod 104, lamp carriage support channels 105 and 111, and lens carriage rods 106 which also support an object mirror, image mirror, lamp carriage and lens carriage, respectively.

Figures 7, 14:
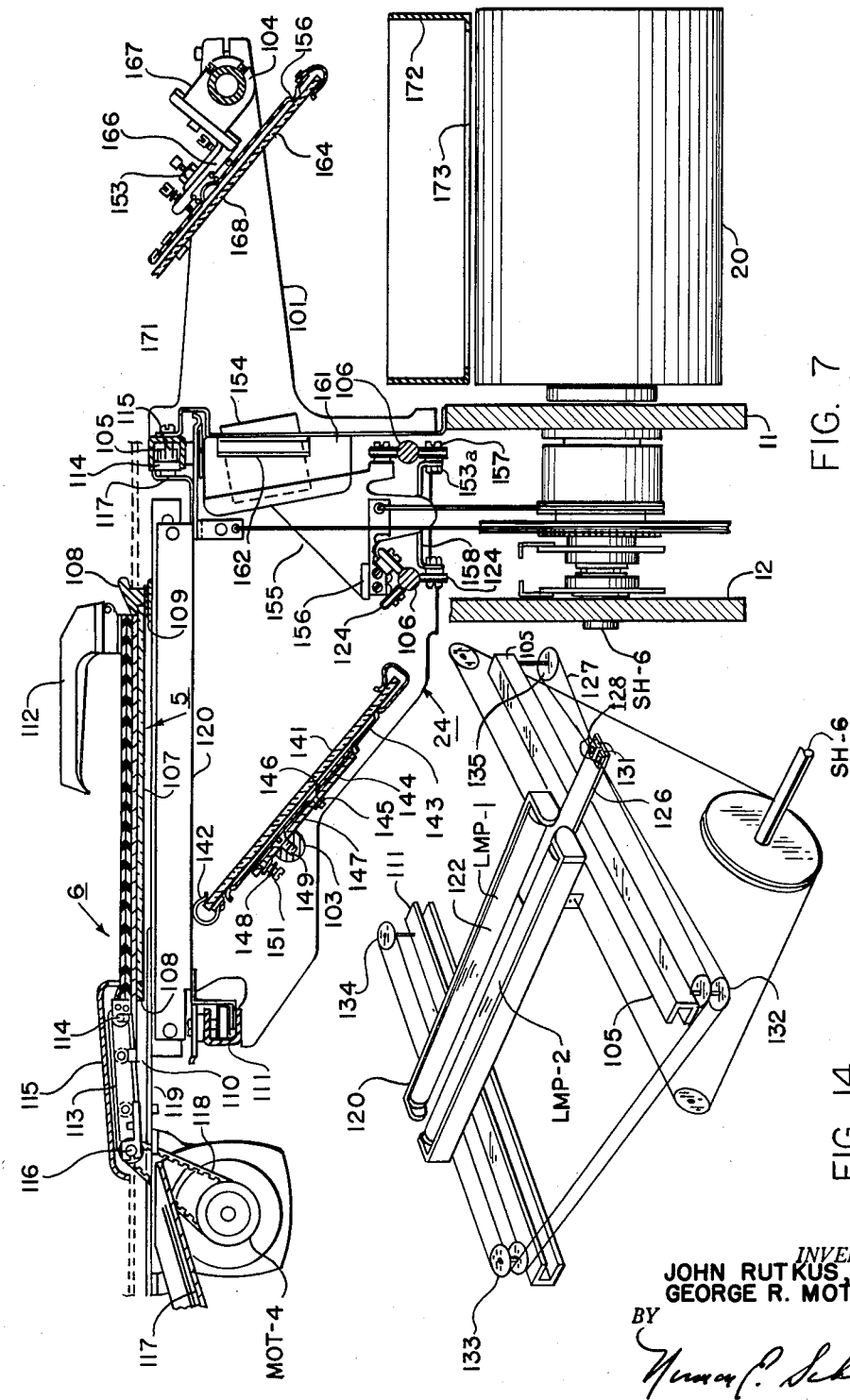
FIG. 7 is a front view, partly in section, of the optical apparatus.
FIG. 14 is a fragmentary perspective view of the lamp drive assembly.

Stationary copyboard 5 is mounted in a suitable opening formed in the top skin of the desk 1, shown only in outline form in FIG. 7. Copyboard 5 consists of a transparent platen or copy holder 107, usually made of glass, which is mounted in a platen frame 108, similar to a picture frame, secured to the support braces 109 and 110 fixed to the machined pads of optical side plates 101 and 102 attached to frame plates 11 and 12, additional support being provided by tie plates 14 and 15. A platen cover 6 is used to cover the platen 107 and to force copy into intimate contact with the platen 107, the platen cover being provided with a handle 112 at one end thereof to permit an operator to lift the platen cover from the platen or copy holder 107.

To permit the platen cover to be raised over large objects to be reproduced, such as books, while still permitting the platen cover to lie in a plane substantially parallel to the platen, and to permit copy to be inserted into a copy conveyor after it is reproduced, the platen cover is hinged indirectly at its opposite end to the frame of endless copy conveyor 113 driven by motor MOT4 through belt 118. Motor MOT4 is mounted on extension plate 119 attached in a suitable manner to the bottom of platen support brace 110.

In actual practice, both the frame of the copy conveyor 113 and the plate cover 6 are pivotally attached to inwardly facing pivot pins 114 fixed to the side walls of conveyor cover 115. The opposite end of the copy conveyor is pivotally secured to bearing brackets 116 secured to support brace 110. Copy fed to copy conveyor 113 is forwarded to copy collecting tray 117 mounted in a suitable opening on the left-hand side of the desk so that the copy may be accessible from the exterior of the desk.

As shown in FIG. 16 the platen frame 108 has guide lines to aid in centering copy on the platen. It is apparent that suitable guide lines could be formed in any suitable manner common in the art, and they can be formed on the platen frame as shown, or directly on the platen.

Although any suitable means may be provided to illuminate the copy, it has been found that a movable light source will provide a more uniform illumination over the entire area of any size copy than any known stationary light source. For this purpose, there is provided a lamp carriage 120 movably supported in the lamp carriage channels 105 and 111.

As illustrated in FIGS. 10 to 13, inclusive, the lamp carriage 120 is substantially U-shaped along the major portion of its length and has a pair of oppositely directed light reflectors 121 secured thereon adjacent and parallel both to the side walls of the lamp carriage and to the longitudinal slot aperture 122 formed in the bottom wall of said carriage.

At its left end, as seen in FIG. 11, the lamp carriage is deformed to provide a dependent leg supporting horizontally and vertically mounted guide wheels 123 and 124 respectively. At its opposite end or right end, the carriage is also deformed to provide an upright leg supporting horizontally and vertically mounted guide rollers 123 and 124, respectively. These guide rollers riding in the opposed openings of the lamp support channels 105 and 111 guide and align the carriage both horizontally and vertically. The guide wheels 123 and 124 are secured by shoulder pins 129 riveted to the legs of the lamp carriage 120.

Extending from opposite ends of the lamp carriage and attached thereto are a pair of horizontally extended cable support legs 125 and 126 to which cable wire 127 is attached by screws and lugs 128 and 131, respectively. As shown schematically in FIG. 14, the cable wire 127, fastened at one end to support leg 126, passes around the top pulley of double pulley 132 over to top pulley of double pulley 133, then around pulley 134 back across cable support leg 125, where it is secured by a single screw 128 and lug 131, to the bottom pulley of double pulley 133, back over to the bottom pulley of double pulley 132, around pulley 135 to support leg 126 where the second end of the wire cable is secured. Double pulley 132 and pulley 135 are rotatably secured to the underside of lamp carriage channel 105 while double pulley 133 and pulley 134 are rotatably secured on top of lamp carriage channel 111 by shoulder bolts 157 threaded into the lamp carriage channels.

By means of the above-described arrangement the lamp carriage 120 is at all times maintained at right angles to the lamp carriage channels 105 and 111. A pair of fluorescent lamps LMP1 and LMP2 are mounted in conventional fluorescent lamp holders 136 secured at the ends of the lamp carriage on the side walls thereof, the lamps being connected in a suitable manner to the electrical circuit of the xerographic copier-duplicator as described hereinafter. Dependent cable support 137 having cable support button thereon is mounted on the right-hand end of the lamp carriage, as seen in FIG. 11 and is adapted to receive opposite ends of a cable attached to the lamp drive pulley of the scan control mechanism as described hereinafter, the tension of the cable being adjusted by means of adjusting screw 138 and nut 139.

Positioned directly below the copy holder in position to receive the image of the object or original copy reflected through the slot aperture 122 in the lamp carriage is an object mirror 141 retained by spring clips 142 in the mirror frame 143. The mirror frame has a circular depression or socket formed along its centerline to receive the ball end of ball pin 144 secured to mirror bracket 147 by snap ring 145, an O-ring 146 encircling the depressed area of the frame and abutting against mirror bracket 147. The position of the mirror frame with respect to the mirror bracket which is fixed to the flat on object support rod 103 as by screw 149 is maintained by spring 148 tensioned screws 151 threaded into mirror bracket 147.

The laterally movable lens assembly consists of a suitable lens 154 positioned in lens carriage 155. The lens carriage as seen in FIGS. 7 and 15 is movably supported on its left-hand side (FIG. 7) by two sets of guide wheels 124 spaced at an angle of 90 degrees from each other riding on top of the left-hand lens carriage rod 106, the wheels being attached to wheel truck 156 secured to the lens carriage. On the right-hand side, the lens carriage is supported on the right-hand lens carriage rod 106 by a single guide wheel 124. Each of the last named wheels is rotatably secured to the lens carriage by threaded shoulder bolts 157. A wheel bracket 158, U-shaped and made of spring steel, is secured at its center to the underside of the lamp carriage and is adapted to support by means of shoulder bolts 157 and nuts 153a, single wheel 124 on each of its legs in alignment with the underside of the lens carriage rods 106, whereby these guide wheels in cooperation with the previously described guide wheels retain the lens carriage in alignment with the lens carriage support rods.

To prevent extraneous light from striking the drum there is provided a slotted shield 161 which extends transversely across and between the optical side plates 101 and 102; the shield being secured to the right-hand lamp carriage channel 105, as seen in FIG. 7. The length and width of the slot in the shield is sufficient to permit the lens 154 to protrude therethrough during its entire transverse movement. To further shield the drum from extraneous light a second shield 162 is mounted on the lens mount 155 to move therewith and block light from being transmitted through the slot in shield 161 as the lens moves back and forth during the scanning cycle. Cable supports 163 are fixed to opposite ends of the wheel truck 156 and are adapted to receive opposite ends of a cable attached to the lens drive pulley of the scan control mechanism, as described hereinafter, cable tension being adjusted by means of adjusting screw 159.

An image mirror 164 secured by spring clamps 142 to the image mirror frame 165 is positioned in the light path from the lens to reflect an image onto the drum through the slot in the fixed light shield 172. The image mirror frame 165 is mounted to a mirror shelf 166 secured to a mirror bracket 167 adjustably positioned on the image mirror rod 104. Mirror frame 165 has a ball socket formed therein to receive the ball 168 adjustably secured to the mirror shelf by nut 153, the image mirror frame being biased away from the mirror shelf 166 by a spring 171 encircling the ball and abutting at opposite ends against the image mirror frame and the mirror shelf. Angular adjustment of the mirror frame 165 with respect to the mirror shelf 166 is accomplished by adjustment screws 151 maintained in fixed position by springs 148.

The light shield 172 is simply an open elongated box having vertical side and end walls and a stepped bottom wall that has a narrow slot 173 extending across its length. The light shield is suitably mounted to a frame plate of the machine directly above and in close proximity to the peripheral surface of the xerographic drum with the centerline of the slot 173 parallel to the axis of shaft SH6. In this position the light shield 172 protects the xerographic drum both during charging and exposure from extraneous reflected light, it being noted that the corona charging device 22 is enclosed by the light shield.

Because the photoconductive surface of the xerographic drum is curved, and in constant motion while the machine is in operation, the image of a copy cannot be projected in its entirety directly onto the photoconductive surface of the xerographic drum. In order to obtain a clear, well-defined image on the xerographic drum, the lens 154 is moved to project line images of the copy onto the xerographic drum, the movement of the lens being synchronized with the movement of said drum so that the line images are properly registered successively with each other on said drum to produce an actual scaled reproduction of the copy on said drum surface. To effect uniform illumination of the copy, a suitable light source is moved at a uniform rate across the copy as previously described, the motion of the light source being coordinated with the movement of said lens and said drum.

This synchronized and coordinated movement of the lens and light source to scan a copy in correlation with the movement of the xerographic drum is obtained by a scan control mechanism 48 which, in the preferred embodiment of the invention, is provided with means by which the length of scan may be varied to compensate for the length of various types of copy.

Actually, in operation, the lens and light source are moved from their respective starting positions in coordinated motion with the xerographic drum in one direction only, that is, their motion is coordinated with the movement of said drum during the actual scan cycle in which a latent image of the copy is formed on said drum, and then at the end of the scan cycle the lens and light source are rapidly returned to their original starting positions, this latter cycle being appropriately termed a return or retrace cycle. It is apparent that since no shutter system is employed with the lens, the xerographic drum is exposed during the return or retrace cycle, but since the drum is constantly in motion, the original exposed image on said drum is not obliterated during the retrace cycle since by this time the area of the drum carrying the previously formed latent image has passed from the exposure station B to developing station C. Unlike regular photographic film, the photoconductive surface of the drum is reusable and consequently no harm is done to its surface during the retrace cycle.

FIG. 17 illustrates the general arrangement of the xerographic drum 20 and the major elements of a preferred scan control mechanism 48 mounted on the horizontal driven shaft SH–6 that rotates in bearings 181 mounted in frame plates 11 and 12. The free end or right-hand end of the shaft SH–6 is threaded to receive thumb nut 182 by means of which the notched hub of the xerographic drum is forced into driven engagement with shaft pin 183 fixed on shaft SH–6. Pulley 184 adapted to be connected by a belt to a source of power, is secured to shaft SH–6 between the xerographic drum and the right-hand face of frame plate 11 as seen in FIG. 17.

Referring now to FIGS. 17 to 22, inclusive, for the details of the scan control mechanism 48, there is shown spring arbor 201 secured as by means of screws 202 to the opposite side or left side of frame plate 11 as seen in FIG. 17, the spring arbor being mounted concentrically with but free of shaft SH–6. To effect the return of the lens and light source, there is provided flat coil return spring 203 encircling the hub of spring arbor 201, the return spring being secured at one end to the spring arbor and at its other end by spring stud 204 to spring housing 205 fixed, as by screws 202, to the hub of lens drive pulley 206 rotatably supported on flange bearing 207 mounted on shaft SH–6. Thrust collar 208 adjustably secured on the threaded portion of spring arbor 201 by set screws 211 abuts against the lens drive pulley to force the flanged end of said bearing adjacent to the drive ratchet 212 fixed by set screw 213 to rotate with shaft SH–6.

Figure 19:
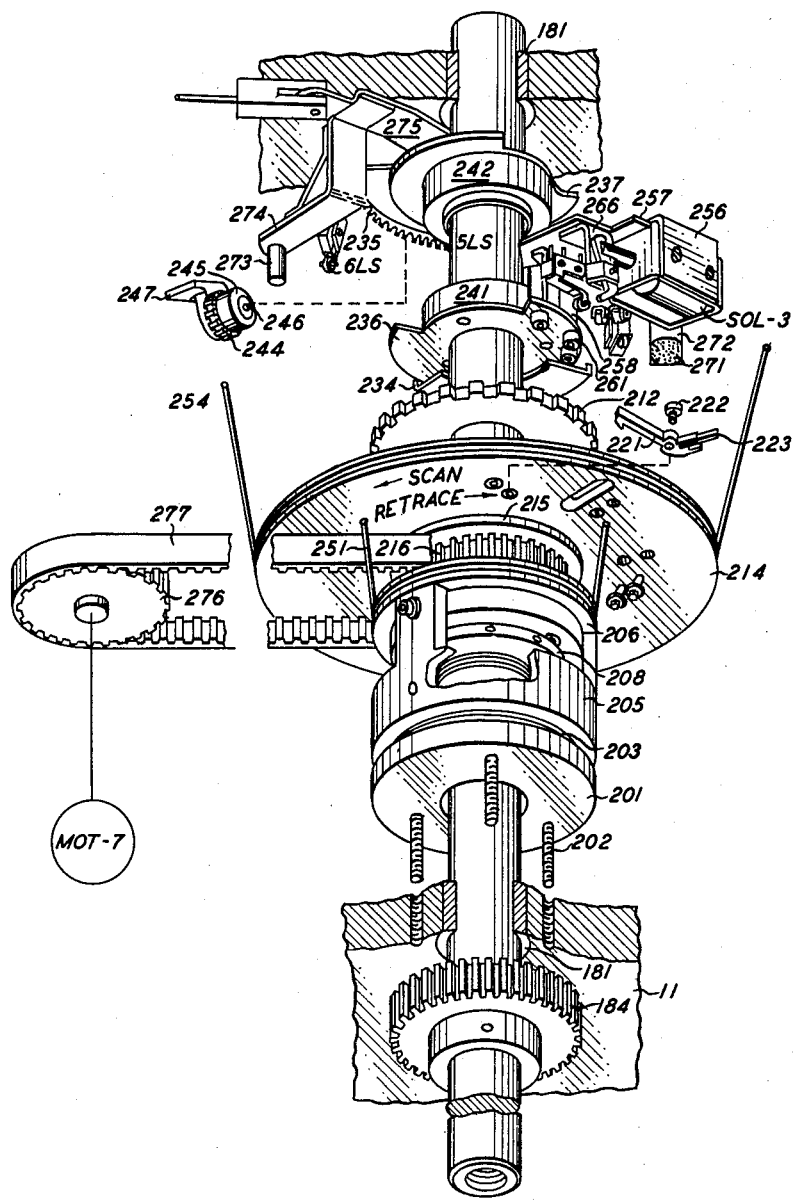
FIG. 19 is an exploded right-hand perspective view of the scan control mechanism of the apparatus.
Figure 21:
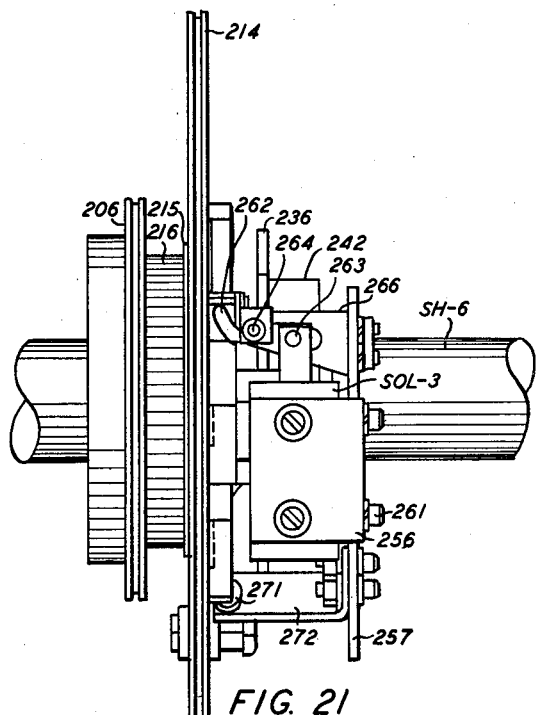
FIG. 21 is a rear view of a part of the scan control mechanism.

It is noted that the size of the return spring 203 is such that when the spring is in its normal expanded condition it may be contracted when the spring housing and of course all elements attached thereto are rotated in a counterclockwise direction as seen in FIG. 19, whereby sufficient energy may be stored up by the spring to rotate the spring housing and its associated elements in a clockwise direction when the driving force rotating the spring in a counterclockwise direction is released.

Figures 18, 20:
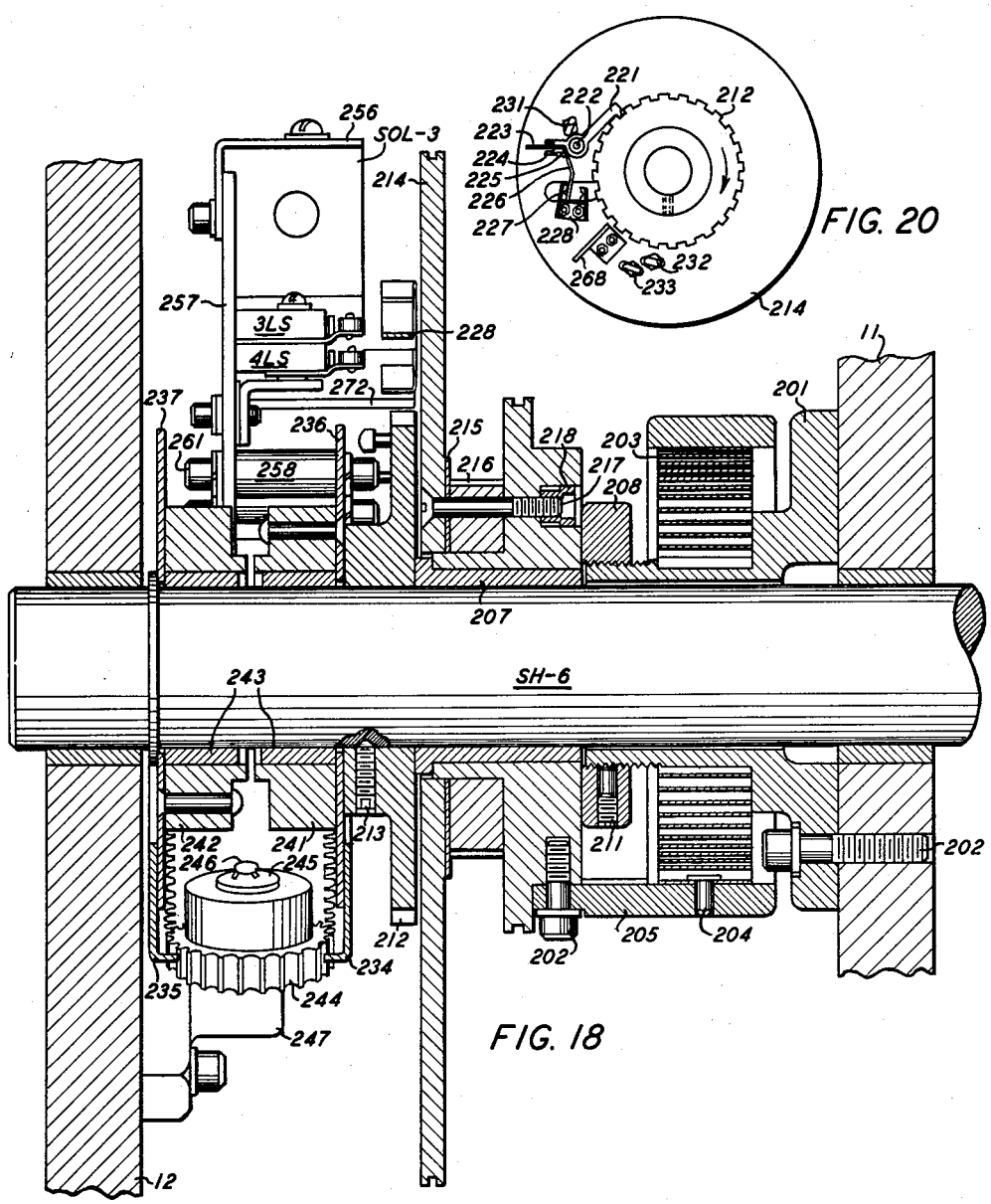
FIG. 18 is a sectional top view of the scan control mechanism of the apparatus.
FIG. 20 is a left-hand view of the drive ratchet and lamp drive pulley of the scan control mechanism.

Fixed to the hub of the lens drive pulley 206 is a lamp drive pulley 214, a spacer disc 215, and a brake pulley 216, the screws 217 passing through the lamp drive pulley, said spacer disc, said brake pulley, and then through said lens drive pulley to be engaged by the nuts 218, thereby forming a unitary drive pulley assembly. To effect drive between these latter elements and the drive ratchet there is provided on the face of the lamp drive pulley adjacent to the drive ratchet, a pawl 221 pivotally secured by pawl stud 222. The pawl is adapted to be selectively moved into or out of engagement with the drive ratchet 212 by means of a pawl lever 223 attached to the pawl as by clamp 224 and screw 225 threadedly engaged into the pawl itself. To maintain the pawl, either temporarily in engagement with the ratchet or temporarily out of engagement with the ratchet, there is provided a pawl arm 226 fastened by clamp 224 to the pawl, said pawl arm being adapted to contact either one of the two magnets 227 secured to bracket 228 fixed to the lamp drive pulley. The pawl arm which is made of suitable metal is retained in position by either the left or right-hand magnet as seen in FIG. 20 unless the pawl itself is mechanically released by actuation of pawl lever 223 with enough force to overcome the magnetic field holding the pawl arm against a magnet.

Radial off-set and angularly disposed actuator studs 231, 232 and 233 project longitudinally from the lamp drive pulley to trip a number of microswitches described in detail hereinafter.

Inner crown gear 234 and outer crown gear 235 are fixed to discs 236 and 237, respectively, mounted on inner and outer hubs 241 and 242, respectively, which in turn are loosely mounted face-to-face by bearings 243 on shaft SH–6 between the drive ratchet 212 and the frame 12. The gear teeth of the inner and outer crown gears mesh on diametrically opposite sides of a pinion gear 244 secured by retaining ring 245 to a stationary gear shaft 246 on gear bracket 247 fixed to the inner face of frame 12. As one gear is rotated in one direction, the other gear is rotated in the opposite direction an equal amount whereby the angular relationship of both the inner and outer crown gears 234 and 235 may be altered for the purpose described in detail hereinafter.

It is noted that the optical apparatus of the type disclosed herein may be used for the reproduction of the same size of the copy or for larger or smaller reproductions.

When one-to-one reproductions are to be made, the lens is positioned optically equally distant from both the copy and the moving surface of the xerographic drum. When smaller or reduced size reproductions are desired the lens must be positioned optically closer to the xerographic drum than to the copy, and obviously the opposite arrangement must be made when larger reproductions are desired.

In the embodiment disclosed, with the lens positioned midpoint in the optical path between the copy and the xerographic drum, said lens must move through a distance at least one-half the length of the copy at a speed equal to one-half the linear speed of the surface of said drum, while the light source which traverses at least the length of the copy is moved at the same lineal speed as that of the surface of said drum.

To accomplish this there is provided a lamp drive pulley 214 and a lens drive pulley 206 coordinated and related so that the working circumference of the lamp drive pulley rotates at the same speed as the circumference of said drum, while the lens drive pulley is one-half the diameter of the lamp drive pulley, whereby its working circumference moves at one-half the speed of movement of the circumference of said drum.

Figure 9:
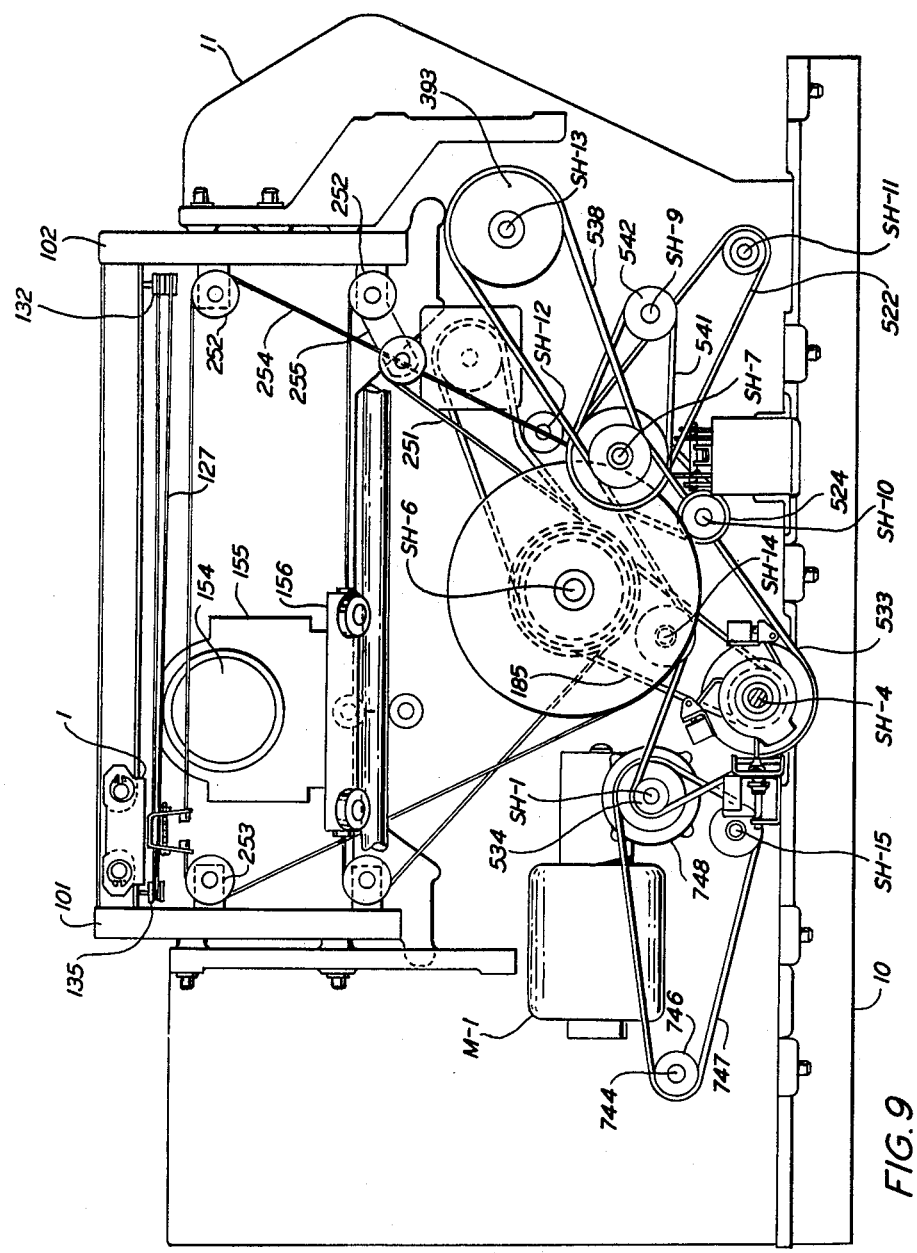
FIG. 9 is a left-hand view of the drive mechanism of the apparatus with the left-hand frame plate of the apparatus removed.

Drive from the lens drive pulley 206 to the lens 154 is provided, as shown in FIG. 9, by wire cable 251 encircling the lens drive pulley 206 and having its opposite ends secured to the cable support 163 on the wheel truck 156, the wire cable 251 being guided by pulleys 252 secured by brackets 253 and 255 to the optical side plates 101 and 102 so that the wire cable as it pulls the lens carriage is movable in a path substantially parallel to lens carriage rods 106.

In a similar manner cable 254 fastened at opposite ends to cable support 137 of lamp carriage 120 encircles lamp drive pulley 214 and is guided by pulleys 252 mounted on brackets 253 secured to optical side plates 101 and 102, respectively, so that the wire cable as it pulls the lamp carriage is movable in a path substantially parallel to lamp carriage channels 105 and 111.

Linear motion of wire cables 254 and 251 by pulleys 214 and 206, respectively, pull the carriages 120 and 155, respectively, along their tracks at corresponding rates of speed with all motions of the carriages being centered about the transverse centerline of the platen 107.

Figure 24:
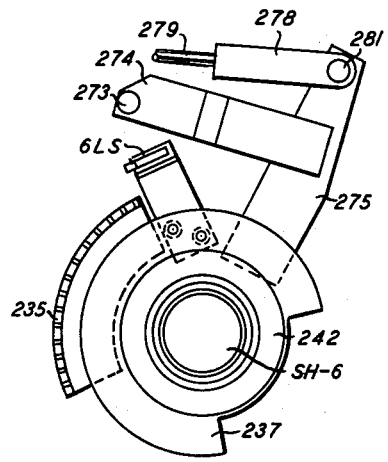
FIG. 24 is a side view of the outer gear assembly of the scan control mechanism.
Figure 23:
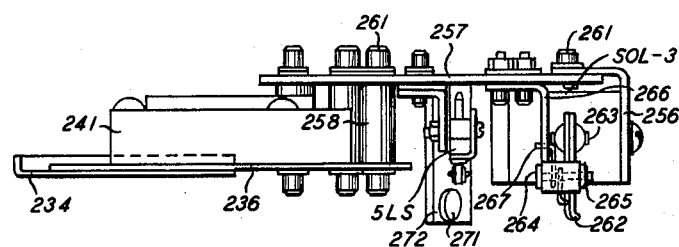
FIG. 23 is a top view of the inner gear assembly of the scan control mechanism.
Figure 22:
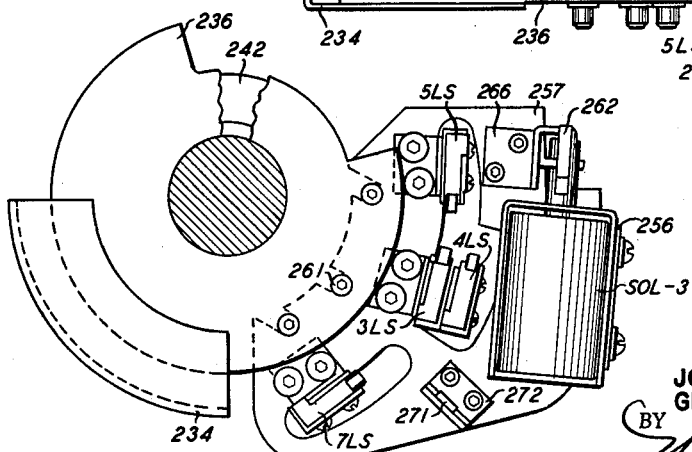
FIG. 22 is a right-hand view of the inner gear assembly of the scan control mechanism.

Since both the feeding of transfer material to the drum and the picking off of transfer material from said drum are directly related in time to the scanning of the leading edge of copy, or its equivalent line on the platen, that is, if the scan mechanism is set to scan twelve-inch copy, scanning begins on a line on the platen adjacent the corresponding guide line on the platen frame, the scan control mechanism 48 which is used to effect operation of the actual scanning cycle to expose the photosensitive surface of the drum is also used to coordinate the above-described functions. To begin the actual movement of the lens carriage and lamp carriage on the scanning cycle there is provided a normally de-energized scan release solenoid SOL–3 mounted on a solenoid angle bracket 256 fixed to a second bracket plate 257 secured in spaced parallel relation to the disc 236 of inner crown gear 234 by spacers 258 and screws 261 (FIGS. 19, 23 and 24). The plunger of the solenoid is notched to receive the slotted end of lever 262 held in position by pin 263. The lever 262, which is adapted to contact the pawl lever 223 of the pawl 221, is journaled on a shoulder stud 264 secured by retaining ring 265 in the lever bracket 266 mounted on said disc 236, and is normally biased to an inoperative position by lever spring 267 encircling shoulder stud 264 with one end of the spring engaging the lever 262 and the opposite end of the spring hooked over and fixed to the lever bracket 266.

The solenoid SOL-3 and the lever 262 actuated thereby are normally maintained in a position with respect to the pawl 221 to move said pawl into engagement with the drive ratchet 212, by means of a stop angle 268 secured to the lamp drive pulley 214 which engages bumper 271, made of a suitable material such as rubber, on bumper angle 272 secured to bracket plate 257; the spring 203 normally biasing the lamp drive pulley in a clockwise direction as shown in FIG. 20. When solenoid SOL-3 is energized its plunger is retracted, causing the lever 262 to engage the pawl lever 223 forcing the pawl 221 into engagement with a tooth of the drive ratchet 212 as shown in FIG. 20, the left-hand magnet 227, as shown in the same figure, magnetically holding the pawl arm 226 of the pawl to the left, thereby retaining the pawl in engagement with the driving ratchet. With the pawl engaged in the drive ratchet the lamp drive pulley and the elements fixed thereto are rotated in a clockwise direction as shown in FIG. 20 until the pawl is forceably tripped out of engagement from the drive ratchet. As the lamp drive pulley rotates, the actuator studs thereon trip the angularly and radially spaced microswitches 3LS, 4LS, 5LS, 6LS, and 7LS secured to the bracket plates on the inner and outer gear assembly, actuator stud 232 effecting closure of microswitches 3LS, 5LS and 7LS on the inner gear assembly, actuator stud 233 effecting closure of microswitch 4LS on the inner gear assembly, and actuator stud 231 effecting closure of microswitch 6LS on the outer gear assembly. Each of these microswitches are actually actuated both on the scan stroke and on the retrace stroke, although they only tie in with the electrical circuit, as explained in detail hereinafter, on one or the other of the strokes but not on both. As is usual in the art, each of these microswitches is provided with a roller actuator which rolls across the contact surface of the actuator studs to reduce friction.

As the lamp drive pulley rotates with the drive ratchet, the pawl lever 223 strikes a pawl trip pin 273 on pin bracket 274 mounted on connector angle 275 secured to the disc 237 of the outer gear assembly as by welding, whereby the pawl is disengaged from the drive ratchet to end the actual scan cycle. Up to this time as the pawl has been engaged with the driving ratchet both the lamp drive pulley and lens drive pulley are rotated as well as the spring housing, the latter forceably contracting the return spring 203, so that as the pawl is disengaged from the drive ratchet, the spring unwinding rapidly acts to return the lamp drive pulley 214 and the elements associated therewith back to their normal starting position, that is, until the stop angle 268 strikes the bumper 271 on the bumper angle 272.

As the lamp drive pulley is rotated in a clockwise direction as seen in FIG. 19, the microswitch 6LS is actuated which closes an electrical circuit described hereinafter to thereby supply current to brake motor MOT7, which acts as a brake on the entire pulley assembly to bring it to a gradual stop. In actual practice, after the full power has been supplied to the brake motor MOT7, the brake motor will stop the pulleys approximately in the original starting position. The pulleys will actually be held at this point until the scanning cycle is again initiated at which time the power to the brake motor is released at which time the pulleys are free to complete their rotation until the angle strikes the bumper. As shown, the brake motor MOT7 is nothing more than a common shunt pole motor having a pulley 276 secured on the end of its shaft, the pulley 276 being connected by means of timing belt 277 to brake pulley 216.

Essentially the actuation and also the location of the solenoid SOL-3 to effect operation of the scan cycle, the microswitches 3LS, 4LS, 5LS, 6LS and 7LS which control various phases of the xerographic and optical cycle, and the pawl trip pin 273, can be considered as being fixed in distance and time from either the start of scan or the end of scan as depicted by the travel of the light source (lamp carriage 120) or the lens 154 as illustrated schematically in FIGS. 25 to 28, inclusive, the actuation of the microswitches in relation to the beginning and end of scan being shown in the timing chart.

Since all motions of the light source and lens are centered about the center line of platen 107, as previously described, and since all elements effecting the starting and stopping of scan, as well as the microswitches 3LS, 4LS, 5LS, 6LS and 7LS are located with reference to either the beginning of scan or end of scan, the length of scan is susceptible to control by merely moving these elements either toward or away from a central point, such as depicted by the centerline of platen 107, to vary the length of scan. Thus, by simply changing the spacing between the beginning and end of scan controls, the length of scan can be varied without affecting the time sequence of operation, with respect to start of scan or end of scan, of the microswitches 3LS, 4LS, 5LS, 6LS and 7LS.

In the embodiment disclosed, solenoid SOL-3, which activates lever 262 to force pawl 221 into engagement with drive ratchet 212 to initiate a scan cycle, is mounted on the disc 236 supporting inner crown gear 234. Pawl trip pin 273 used to force pawl 221 out of engagement with drive ratchet 212 to end the scan cycle is mounted on disc 237 supporting outer crown gear 235. Both the disc 236 supporting solenoid SOL-3 and the disc 237 supporting pawl trip pin 273 are pivotally mounted by hubs 241 and 242, respectively, on shaft SH6 to permit angular displacement of these elements with respect to each other by means of the crown gears 234 and 235, respectively. With both the inner crown gear 234 and outer crown gear 235 operatively connected together by pinion gear 244, movement of one gear will be reflected by an equal but opposite movement of the other gear, thus permitting coordinated angular displacement of both solenoid SOL-3 and pawl trip pin 273 by the manipulation of only one gear.

A change of angular displacement of the gear carrying the scan initiating mechanism, in this case solenoid SOL-3, with respect to the gear carrying the end of scan control mechanism, trip pin 273, will effect a change in the length of travel of the lens carriage and lamp carriage; that is, if a short length of carriage travel is desired, the angular displacement between the solenoid SOL-3 and trip pin 273 on the gears is made small, and conversely for a larger length of carriage travel the angular displacement between solenoid SOL-3 and trip pin 273 on the gears is increased.

Although a variable length of scan mechanism has been used in the preferred embodiment of the invention, it is apparent that this variable length of scan feature could be modified by simply fixing the distance between the elements initiating and stopping the scan travel. If a fixed length of scan is used, it is apparent to persons skilled in the electromechanical art that the above-described elements need not be mounted in the positions illustrated, but could be mounted in a suitable manner, as for example, on the lens carriage rods or on the lamp carriage channels to be actuated by movement of the lens carriage or lamp carriage, respectively.

Figure 25:
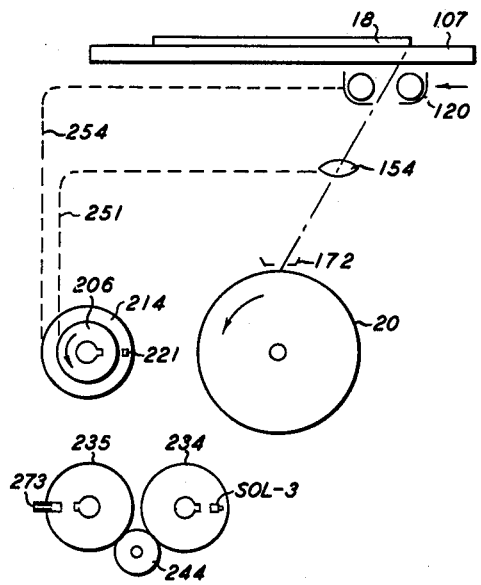
FIG. 25 is a diagrammatic illustration of the optical system and its controls at the start of scan of a long copy.
Figure 26:
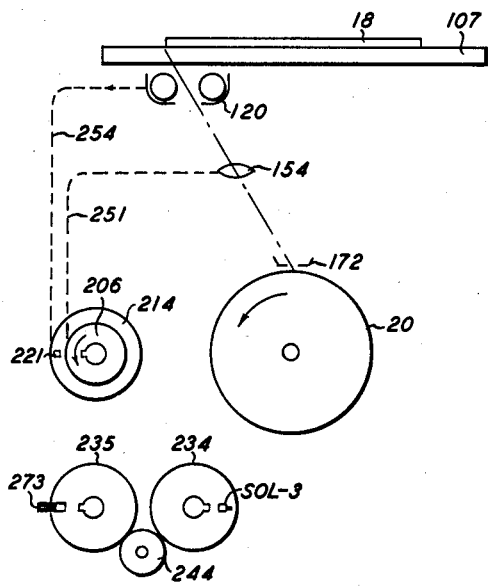
FIG. 26 is a diagrammatic illustration of the optical system and its controls at the end of scan of a long copy.

FIG. 25 illustrates schematically the relative positions of the light source, lens, lamp drive pulley and lens drive pulley, at the start of a scan cycle for maximum length of scan with the relative position of the crown and pinion gear of the scan control mechanism adjusted to effect this long scan. FIG. 26 shows the relative position of these elements at the end of scan.

Figure 27:
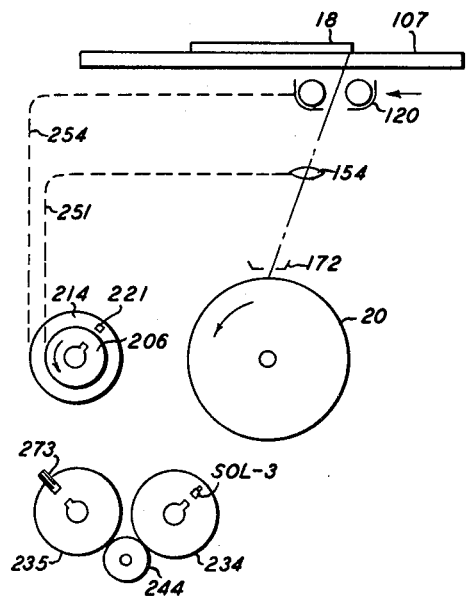
FIG. 27 is a diagrammatic illustration of the optical system and its controls at the start of scan of a short copy.
Figure 28:
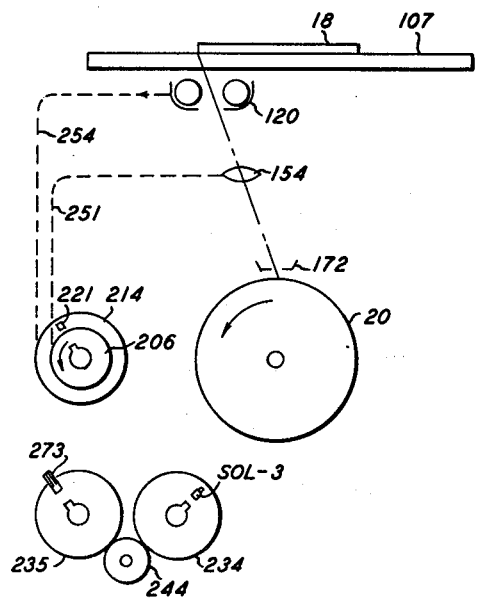
FIG. 28 is a diagrammatic illustration of the optical system and its controls at the end of scan of a short copy.

As illustrated in FIGS. 27 and 28 which show the above described elements at the start and end of scan, respectively, it is apparent that crown gear 234 has been rotated clockwise while crown gear 235 has been rotated counterclockwise to shorten the length of scan by limiting the degrees through which the lamp and lens drive pulleys are rotated.

To permit an operator to control the length of scan there is provided a control knob, accessible at the lower control panel 7, connected through a cable 279 and cable control system described hereinafter to the cable connector 278 pivotally secured by connector pin 281 to the connector angle 275 of outer crown gear 235.

Referring now specifically to FIGS. 29 to 37, inclusive, the apparatus for feeding sheets of transfer material to the xerographic drum 20 in timed relation to the appearance of a developed image thereon includes a pair of forwarding or feed rollers 401 and 402, usually made of rubber or similar material, mounted in cooperative relation to each other in front of guides 403 and 404 which direct sheets of transfer material forwarded by said feed rollers into contact with the drum 20 at a point at or slightly in advance of the corona transfer device 34.

Feed roller 401, which is a driven roller, is mounted in position by shaft SH-10 journaled in frame plates 11 and 13 and is driven by pulley 405 secured to the end of shaft SH-10. Feed roller 402, which is an idler roller, is mounted on shaft SH-8 journaled at its ends in arms 406 pivotally mounted on frame plates 11 and 13, the feed roller 402 being yieldingly biased against the feed roller 401 by means of springs 407 so that feed roller 402 may be driven by frictional engagement with roller 401 or with a sheet of transfer material interposed between said rollers.

A supply of cut-sheet transfer material 408, that is, typically sheets of paper or the like, to be fed one at a time to the feed rollers 401 and 402 is held in a paper tray 411 slidably positioned at the front of the machine between frame plates 11 and 13. The paper tray 411 includes a base member 412 having angle plates 413 and 414 secured thereon as by welding, said angle plates being positioned with their upright legs parallel to the sides of the base member and with their lateral legs partially extending over the center channel of the base member to form a slot 415.

Sheets of transfer material are positioned both longitudinally and laterally on the tray by means of margin guides 416 and 417 adjustably mounted on the tray. Each of the margin guides 416 and 417, formed complementary to each other, is provided with an upright back leg at right angles to the side leg to guide the back edge of the material and a lateral extending leg adapted to rest on the top of said tray.

The margin guides are adjustably positioned on the tray by means of back guide 418 adapted to be selectively positioned along the length of said tray. Back guide 418 is centered in the tray by means of bar 421, adapted to ride in slot 415, secured in a suitable manner to the underside of the extension leg of the back guide. Leaf springs 422, interposed between bar 421 and a second bar 423 secured thereto, hold the back guide 418 in position on the tray while still permitting longitudinal adjustment of the guides. Since the back guide 418 is made of relatively thin sheet metal, a backing bar 424 is secured to the upright leg of back guide 418 so that the slots in the backing bar 424 are aligned with slots in the back guide.

To permit lateral adjustment of the margin guides 416 and 417, each of said margin guides is provided with a stud 425 secured thereto which projects through a slot in the back guide and backing bar to be engaged by a washer 426 and thumb nut 427 whereby each guide may be tightened against the back guide.

Each of margin guides is provided with a friction pad 428, usually made of rubber or other suitable material which will hold a stack of transfer material with sufficient force to prevent the entire stack from sliding when the top sheet is withdrawn, and for somewhat the same reason two pads 431, of similar material, are positioned at the right-hand end of the tray, as seen in FIG. 31.

To aid an operator to correctly position a stack of transfer material in the tray, the back guide 418 is provided at its opposite ends with two duplicate scales for lateral positioning of the stack while the angle plate 414 is provided with a scale for longitudinal positioning of the stack.

Right-hand bracket 432 and left-hand bracket 433, respectively connected to the frame plate 13 and base plate 10, are adapted to support the paper tray assembly by means of a pair of commercial type drawer slides. As shown in FIGS. 31 and 32, the female portions 434 of the slides are secured in a suitable manner to the brackets 432 and 433, and the complementary portions 435 are secured to the angle plates 413 and 414 with shims 436 interposed between the angle plate and the complementary portions 435 as required.

As shown in FIG. 30, the tray 411 is positioned for seriatim feeding of single sheets therefrom by means of a spring detent 437, secured to the inclined surface of base plate 10, which locks into the opening 438 formed in base member 412. Also mounted on the base plate 10 are a pair of bumpers 441 positioned to strike the depending stops 442 secured to the bottom side of base member 412. To prevent spring detent 437 from arresting the movement of the tray 411 as it is inserted into operating position, spring detent depressor 443 is struck up at the end of base member 412 to permit the tray to slide over detent 437.

To feed sheets of transfer material one at a time from the paper tray 411 into the bite of the feed rollers, there is provided a paper feeding and separating means comprising intermittently driven rollers 451 fixedly mounted upon shaft 452 journaled in bearings 453 mounted in arm 454 adapted to swing about the axis of shaft 455. As shown in FIG. 33, the arm 454 consists of arm sheils 456 and 457 butted together and held in place by screws 458 extending through the arm shells to be threaded into spacers 459.

The means for driving the rollers 451 comprises pulley 461 secured to a conventional slip clutch 462, and pulley 463 mounted on shafts 452 and 455, respectively, and operatively connected together by means of timing belt 464.

The slip clutch 462 permits the rollers 451 to be rotated either by timing belt 464 or by frictional contact with a sheet of transfer material as it is pulled forward by feed rollers 401 and 402.

Shaft 455 which is journaled by bearing 465 in frame 13 and by bearing 466 in arm shell 456 is normally biased to the left as seen in FIG. 33, by means of spring 467 interposed between snap ring 468 on shaft 455 and shaft encircling washer 471 butted against frame 13. As shaft 455 is forced to the left, the notched end of said shaft is forced into the aperture in the end of shaft SH-11 to engage drive pin 473 secured therein. As shown in FIG. 34, shaft SH-11 which is journaled in bearings 464 positioned in frame 12 and sleeve 475 has an intermittently driven pulley 476 secured thereon. Washers 477 and 478 ride against a shoulder on shaft SH-11 to prevent axial movement of said shaft to the left as seen in FIG. 34.

To adjust the pressure of rollers 451 on the stack of transfer material in paper tray 411, the arm 454 is fixed to one end of arm shaft 481, the opposite end of the arm shaft being notched to engage drive pins 482 secured to the counterboard end of sleeve 475 journaled in frame 11, the sleeve being retained against axial movement to the right as seen in FIGS. 33 and 34 by snap ring 483 secured in a suitable groove formed in the sleeve.

A spring tension sleeve 484, having gear 485 secured thereon by pin 479, is loosely mounted by a bearing 464 adjacent sleeve 475 on shaft SH-11, and is axially aligned on the shaft by thrust bearing 486 abutting snap ring 487 positioned in a suitable groove on the shaft. Torque is applied by means of coil spring 488 secured at one end by spring pin 491 to sleeve 475 and at its opposite end to spring tension sleeve 484 by having the end of the spring forced into a suitable aperture in said spring tension sleeve. By rotating gear 485 by means of chain 489 operated in a suitable manner (not shown) by a control lever in lower control panel 7, roller pressure on the stack of paper in paper tray 411 can be adjusted by an operator to accommodate any weight paper used as a transfer material.

Interposed between rollers 451 and feed rollers 401 and 402 there is provided, as shown in FIGS. 29 and 30, a pair of paper guides 492 and 493 supported at opposite ends by frames 11 and 13 to guide each sheet of transfer material forwarded by rollers 451 into the bite of rollers 401 and 402.

To permit the rollers 451 to clear a stack of transfer material in tray 411 as the tray is moved to its normal operating position as shown in FIG. 29 or when the tray is removed from its normal operating position, there is provided a cam arm 494 and cam follower 495 to pivot arm 454 to elevate the rollers 451.

As shown, cam arm 494, having a cam riser at one end thereof is secured at its opposite end, as by welding, to sleeve 475 connected by means of arm shaft 481 and arm pins 482 to the arm 454, whereby movement of the cam arm 494 effects an equal movement of arm 454. To effect movement of cam arm 494 as the tray 411 is moved into or out of its normal operating position, the cam follower 495 is secured to a cam follower support 496 fixed to the vertical leg of angle plate 413 of tray 411.

Clutch Mechanism

Both the operation of the paper separator rolls 451 and the paper feed roll 401 is effected by clutch mechanism 52 having separate clutch drives, the selection of the drives being controlled by means of a solenoid-operated clutch shifter actuated by the programmer 50.

Figure 35:
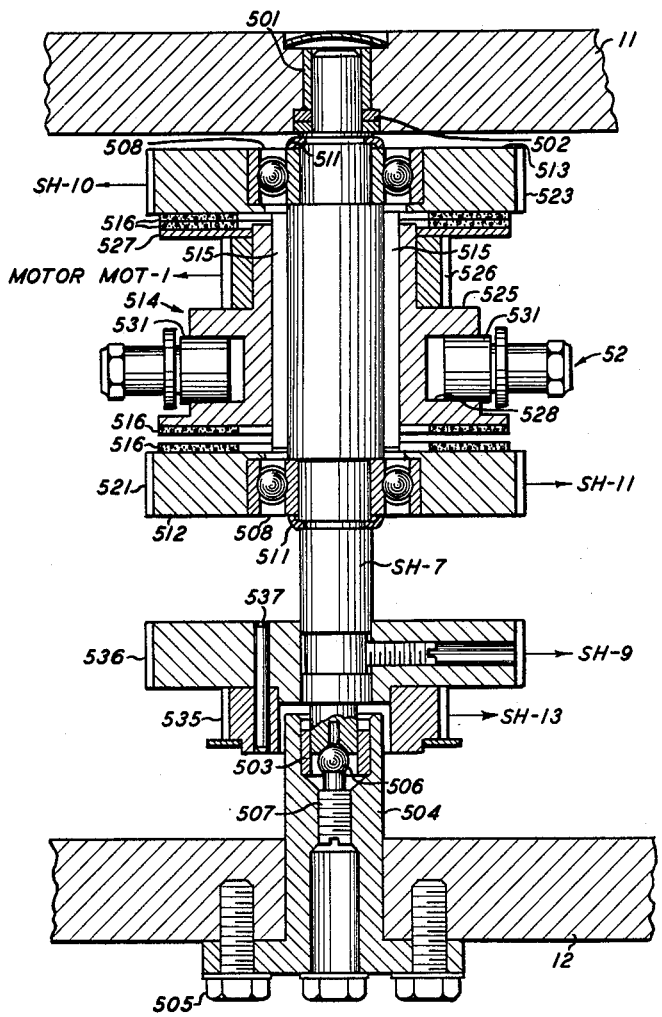
FIG. 35 is a sectional view of the clutch mechanism of the paper feed system.

As illustrated in FIGS. 35, 36 and 37, clutch mechanism 52 which is supported and housed by the frame plates 11 and 12, includes a horizontal driven shaft SH-7 that rotates at one end in bearing 501 mounted in frame 11, the shoulder of the shaft at this end riding against thrust washers 502 also mounted in frame 11.

At its opposite end the shaft SH-7 is journaled in bearing 503 mounted in flanged bearing bracket 504 which extends through frame 12 and is secured thereto by bolts 505. Axial alignment and end thrust of the shaft is controlled by means of thrust ball 506 engaged in the socket formed in the end of shaft SH-7 and in the socket of screw 507 threaded into bearing bracket 504.

The inner races of bearings 508 mounted on shaft SH-7 against bearing locating shoulders formed on the shaft are secured in position by bearing retainers 511 located in suitable grooves in the shaft adjacent the bearings. The outer races of the bearings 508 support complementary clutch elements 512 and 513 which are free to rotate relative to the shaft. A third clutch element 514, adapted to coact with complementary clutch elements 512 and 513, is fitted on shaft SH-7 in interposed relation to clutch elements 512 and 513 and is free for relative movement with respect to the axis of the shaft SH-7, but is connected to the shaft for rotation therewith by means of keys 515. All three clutch elements are of the annular plate type, but element 514 differs from the others in that it presents two oppositely facing frictional pads 516 respectively in opposed relation to the inwardly facing frictional pads 516 of clutch elements 512 and 513.

The frictional surfaces of clutch element 514 are spaced from the opposed surfaces of clutch elements 512 and 513 to permit axial movement of clutch element 514 whereby it may be selectively engaged with either clutch element 512 or clutch element 513.

Clutch element 512 is provided with peripheral teeth 521 and is in effect a drive pulley wheel adapted to be connected, as shown in FIGS. 9 and 29, by timing belt 522 to driven pulley 476 mounted on shaft SH-11 to drive the paper separator rolls. In a similar manner, clutch element 513 is provided with peripheral teeth 523 and is in effect a drive pulley wheel adapted to be connected by timing belt 524 to driven pulley 405 mounted on shaft SH-10 to drive the paper feed roll 401.

Clutch element 514 includes a hub 525 fixedly supporting ring pulley 526 and annular plate 527 staked onto its reduced portion, the friction elements of the clutch element being secured to flanged end of hub 525 and annular plate 527, respectively. The hub 525 is provided with an annular groove 528 adapted to receive the rollers 531 of the yoke mechanism described hereinafter whereby the clutch element 514 may selectively be moved into or out of engagement with either of the clutch elements 512 and 513. The ring pulley 526 is adapted to be connected by timing belt 533 to a pulley 534 mounted on the main drive motor MOT-1, see FIG. 9, whereby the shaft SH-7 is continually rotated while the machine is in operation.

Secured as by set screws to the left-hand end of the shaft SH-7 are a pair of pulleys 535 and 536 connected together by pins 537, pulley 535 being adapted to be connected by belt 538 to pulley 393 mounted on shaft SH-13 to drive the toner dispenser 28 and pulley 536 being adapted to be connected by belt 541 to pulley 542 mounted on one end of shaft SH-9 to drive gear 351, mounted on the opposite end of the shaft, which engages gear 337 of the developer conveyor as previously described.

The clutch shifter mechanism for shifting clutch element 514 with respect to clutch elements 512 and 513 includes a shifter bracket 543 mounted on base plate 10. A forked double crank lever 545 which consists of two Y levers 546 and 547 held in spaced parallel relation to each other by spacer sleeve 548 and by the rod 551 is rotatably mounted on spindle 552 positioned in the upright legs of shifter bracket 543, the spindle 552 being retained in position by snap rings 553 inserted in suitable grooves at opposite ends of the spindle. As shown, spacer sleeve 548 encircles spindle 522.

Rollers 531 adapted to ride in the groove 528 in clutch element 514 are rotatably secured to the inner faces of the Y levers 546 and 547 at the forked end of the double crank lever 545 by means of roller bolts 554 inserted in the rollers, passing through the Y levers to engage lock nuts 556. The normally open solenoid SOL-1 connected to a suitable electric circuit described hereinafter, is mounted by means of solenoid bracket 557 to frame 12. The plunger of the solenoid SOL-1 is notched to receive clevis 558 pivotally secured to the plunger by clevis pin 559.

Spacer sleeve 548 is provided with a longitudinal slot to receive the bent end of actuator spring 561 which extends over and under split pins 562 in the crank lever to be secured by retainer pin 563 in the forked end of clevis 558, whereby the rollers on the crank lever may be forced to the left in FIG. 35 to shift clutch element 514 into engagement with clutch element 512 when the solenoid 501 is energized.

Normally clutch element 514 is forced into driving relationship with clutch element 513 by means of the rollers which are normally biased to the right by tension spring 565 connected at one end to the upright leg of shifter bracket 543 and at its other end engaging rod 551. The tension of spring 565 should be great enough to supply the required pressure between coacting clutch elements 514 and 513 while still permitting solenoid SOL-1 to overcome the force of the spring to bring clutch element 514 into operational relationship with clutch element 512.

Referring now back to the operation of the separator rollers 451 and the feed rollers 401 and 402, when the paper separator rollers 451 are driven by the clutch element 512, the clutch element 513 for driving roller 401 is disengaged from the power source by disengagement from clutch element 514 when solenoid SOL-1 is energized. As the rollers 451 are driven they forward a sheet of transfer material into the bite of rollers 401 and 402 where its forward motion is momentarily stopped. As the movement of a sheet of transfer material under rollers 451 continues after the leading edge of the sheet has been stopped by rollers 401 and 402, the sheet is buckled as the rollers continue to rotate. The rotation of rollers 451 is continued just sufficiently to bow the paper whereby the resiliency of the paper forces the leading edge of the sheet into transverse alignment with the rollers 401 and 402, irrespective of its original alignment thereto, so that the paper is forwarded by said rollers in correct alignment with the drum as roller 401 is activated when solenoid SOL–1 is de-energized, permitting clutch element 514 to engage clutch element 513 through the biasing action of spring 565.

Air Puffer

In the image transfer station the powder images previously formed on the xerographic drum are electrostatically transferred to a sheet of transfer material, the electrostatic charge being applied to the transfer material by means of the corona transfer device 34. The electrostatic charge applied to the transfer material during the transfer process is sufficient to cause the transfer material to adhere to said drum even after the material has passed out of the corona emission area. It is apparent that there must be provided some means for removing the transfer material from said drum.

Although mechanical means, such as strip fingers common in the printing art, may be used to remove the transfer material from the drum, mechanical means of this type may injure the photoconductive surface of the drum or destroy the powder images on the transfer material. To prevent destruction of the powder images on the transfer material and to prevent damaging the drum, there is provided a pick-off mechanism 36 constructed in accordance with the invention.

A preferred form of a pick-off mechanism, constructed in accordance with the invention, is illustrated in FIGS. 30, 38 and 39, and employs a manifold having multiple outlet conduits or nozzles directed against the surface of the xerographic drum so that jets of compressed aeriform fluid from said nozzles are directed against the leading edge of a sheet of transfer material to blow said edge of the material off of the drum, the remainder of the transfer material then peeling off from the drum due to its own weight. The manifold may be supplied with compressed aeriform fluid by means of a pulsator or similar source of compressed aeriform fluid.

Specifically in the embodiment disclosed, there is provided a discharge manifold 571 positioned adjacent to the drum 20 and parallel to the axis of said drum by means of manifold clamps 572 which may be secured to a structural element of the machine, as for example, the manifold mounts may be connected to the drum cleaning device 46. Multiple, parallel spaced outlet conduits or nozzles 573 secured to the manifold, as by welding, are positioned so that streams of compressed aeriform fluid emerging from said nozzle are directed to stroke the surface of the xerographic drum at an angle approximately tangent to the surface of said drum.

The manifold 571 consists of tube 574 counterbored at opposite ends to receive the plug 575 and the tube coupling 576, each of which is press fitted into place. Each outlet conduit or nozzle 573 is passed through a hole in the wall of tube 574 so that the inner end of each of said conduits is in communication with the interior of the tube.

Compressed aeriform fluid is delivered to the manifold by means of a flexible tube 577 connected at one end to the manifold tube coupling 576 and at its other end to the male hose connector 578 fastened to street elbow 581 threaded into the pulsator 582.

Although any suitable pulsator may be used to supply compressed aeriform fluid to the manifold, the pulsator illustrated in FIGS. 38 and 39 consist of a cylinder 583 closed at opposite ends by cylinder heads 584 and 585 threaded thereon. Cylinder head 584 is threaded to receive street elbow 581 which, since this is a pulsator and not a pump, functions as both an inlet and discharge conduit for the cylinder. At the other end of the cylinder, cylinder head 585 is bored concentric with its center to receive bearing 586 which slidably supports piston rod 587.

Mounted within the cylinder 583 on the reduced end of piston rod 587 is a piston 588 encircled by pump cup 589 axially aligned on the piston rod by means of a cup-retaining washer 590 and snap ring 591. Both the piston 588 and cylinder head 584 have annular grooves formed therein to receive opposite ends of spring 592, whereby said spring is positioned to bias said piston on its return stroke. To prevent a buildup of pressure, either positive or negative, behind the piston assembly there is provided bored relief passages 593 in cylinder head 585.

For supporting both the pulsator and its prime mover, solenoid SOL–2, there is provided a pulsator base 594 mounted by shock mounts 595 to base plate 10. The transverse wall of the pulsator base is perforated to receive the pulsator which is held in place therein by a first snap ring 596 positioned on cylinder 583 adjacent to one side of said wall and by O-ring 597, washer 598 and a second snap ring 596 positioned on the cylinder adjacent to the opposite side of said wall, said snap rings being positioned in suitable annular grooves formed on the exterior of cylinder 583.

The normally de-energized solenoid SOL–2 secured to the side walls of the pulsator base 594 is adapted to actuate the compression or forward stroke of the piston rod of the pulsator by means of the actuator block 599 fastened to the forked left-hand end of the plunger of said solenoid, as seen in FIG. 39.

As the solenoid SOL–2, which is connected to a circuit described hereinafter, and controlled by a switch 2LS on programmer 50, as described herein, is energized, the magnetic field created by the imposed electrical pulse pulling the plunger into the field and coil of said solenoid which in turn results in pushing the piston rod 587 in the same direction, left as seen in FIG. 38, to effect a compression or forward stroke of the piston. As a result of the compression stroke there is provided a small volume of compressed aeriform fluid which passes from the manifold 571 out through the nozzles 573 into contact with the drum 20.

The operation of the solenoid SOL–2 is so timed that multiple jets of aeriform fluid are directed against an area of the surface of the xerographic drum to coincide with the appearance of the leading edge of a sheet of transfer material thereon.

The pulsator 582 or other source of compressed aeriform fluid should be so sized or regulated that jets of fluid delivered by said nozzles against the drum are of such a short duration that they are directed toward the drum for a short period of time, just prior to the arrival of the leading edge of a sheet of transfer material in the area of sheet removal until the leading edge of said material has just passed this area to insure the deflection or peeling away from said drum of the leading edge of said material. Once the leading edge of a sheet of transfer material has been separated from the surface of the xerographic drum, the remainder of the sheet will peel off due to its own weight without distorting the powder images on the sheet which are face up as the sheet leaves said drum. Contributing to the short duration of the fluid blasts is the fact that as the solenoid SOL–2 is de-energized the return stroke of the piston effected by spring 592 reverses the fluid flow in the nozzles 573 since on the return stroke air is drawn into the pulsator through these nozzles then acting as inlet conduits to supply air to the pulsator.

To permit the full beneficial utilization of the variable scan mechanism to make the maximum number of reproductions per unit of time, the xerographic machine disclosed in the preferred embodiment has incorporated therein a preferred programmer 50, of the type disclosed in copending Eichler et al. application, Serial No. 824,657, filed concurrently herewith on July 2, 1959, which is actually an electromechanical device or multiple delay timing device. The programmer used consists of two rotatable clutch elements having cam risers thereon to activate both the paper feed mechanism and the pick-off mechanism of the xerographic machine. As one clutch element is rotating and programming the various steps still required to produce the finished reproduction of a first copy, the machine is free to start on a second cycle using the second clutch element to activate the processes required to complete the reproduction of a second copy. By the time the machine is set to scan a third copy, the first clutch element has completed its programming operation and is ready to control the cycling program for a third copy.

It should be pointed out at this that the terms first, second and third copy refer figuratively to any sequence of copies of the same or different original copies. Specifically, the programmer, generally designated 50 consists of three subassemblies, namely, a clutch assembly 601, a clutch release mechanism 630, and a microswitch assembly 660, shown in detail in FIGS. 40 to 42, inclusive.

The above-described assemblies are supported by frame plates 11 and 12 which optionally, as shown, may be formed as an integral element of the xerographic machine frame proper, or alternatively may be formed as a separate unit for mounting to the xerographic machine.

The clutch assembly includes a pulley 602 mounted on the outer end of programmer shaft SH-4 that is journaled in bearings 603 provided in the frame plates 11 and 12; pulley 602, which is a drive pulley, being connected to pulley 184 on drum shaft SH-6 by belt 185 adapted to drive the drum shaft SH-6 at a constant speed relative to the speed of shaft SH-4. When applied to the shaft the inner end of pulley 602 abuts thrust bearing 604 inserted in the outer surface of frame plate 11; a set screw 605 being provided whereby the pulley may be clamped tightly to the shaft and against said thrust bearing thereby limiting axial movement of the shaft in one direction. To limit axial movement of the shaft in the opposite direction there is provided a snap ring 606 secured in a suitable groove formed on the shaft, the snap ring being positioned to abut against a thrust washer 607 positioned against the inner surface of the frame plate 11.

The programmer shaft SH-4 is driven by means of a pulley 608 secured thereto inboard of the frame plates 11 and 12, the pulley being operatively connected to drive motor MOT1 in a conventional manner as by belt 533, which also drives the clutch mechanism previously described.

Clutch element 611 of the clutch assembly proper is mounted by its hub on shaft SH-4, and is secured against rotation relative to the shaft by engagement of radial screw 617 carried by the shaft, with the longitudinal slot 612 provided in the end of the hub of said clutch element. A second clutch element 613, which is complementary to clutch element 611 is fixedly secured on shaft SH-4 by set screw 614. Complementary clutch elements 611 and 613 therefore turn with shaft SH-4 whenever it is rotated. Third and fourth clutch elements 615 and 616, respectively, which are described in greater detail hereinafter, coact with complementary clutch elements and are free for relative rotation with respect to the shaft under conditions of clutch slippage, clutch elements 615 and 616 being held apart in spaced relation to each other by bearing element 618 mounted on shaft SH-4.

Complementary clutch elements 611 and 613 are of the annular plate type having inwardly facing frictional surfaces 621 made of suitable material such as cork, secured as by gluing to the annular undercut portions of the inward faces of clutch elements 613 and 611.

In order to provide means for applying the required pressure to the coacting clutch elements to meet operational conditions, a compression spring 622 is applied around the shaft between clutch element 611 and thrust washer 607, the latter abutting a second thrust washer 623 positioned adjacent frame 12. The force of spring 622 should be sufficient to permit the clutch elements 615 and 616 when free to rotate to be driven by the clutch elements 611 and 613, respectively, while still permitting the clutch elements to slip relative to each other when clutch elements 615 and 615 are secured to prevent their rotation.

Clutch elements 615 and 616 are essentially flat discs provided on their outer peripheral surfaces with cam risers 624 and 625, respectively, adapted to be engaged by suitable holding means described in detail hereinafter, whereby the clutch elements may be retained against rotative movement until released by said holding means, said cam risers also being adapted, when said clutch elements are rotating, to actuate microswitch 1LS also described hereinafter. The clutch elements 615 and 616 are also provided with inwardly projecting cam buttons 626 that are secured to said clutch elements as by peening over the edges of the cam buttons passing through the clutch elements, the cam buttons being adapted to actuate a second microswitch 2LS described hereinafter.

Figure 41:
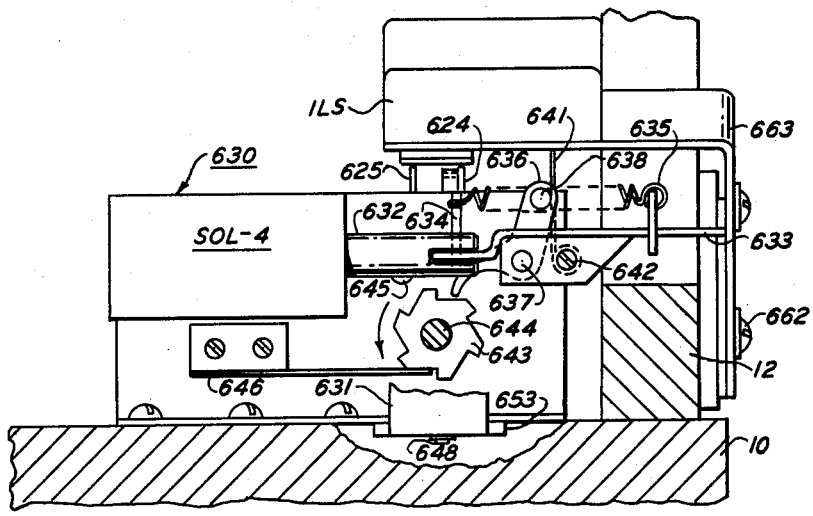
FIG. 41 is a rear view of the programmer mechanism, with parts broken away to show details of the structure.

The clutch release mechanism generally designated 630 includes base panel 631 by means of which the operating elements of the clutch release mechanism may be supported in the usual manner to a frame element, in this case, base 10. The base panel 631 has attached in one corner thereof on one of its upstanding legs a normally open solenoid SOL-4 having a plunger 632. As seen in FIG. 41 the plunger is notched to receive one end of a slide 633, the other end of the slide being guided in a suitable notch formed in an inturned leg member of the base panel. The slide 633 is secured to the plunger of the solenoid by means of a pin 634 which also secures one end of spring 635, the opposite end of the spring being secured to the inturned leg member of the base panel 631, whereby the plunger is normally maintained in an extended position by said spring, it being realized that the spring should be of sufficient tension to normally maintain the plunger extended while still permitting the plunger to be retracted when the solenoid SOL-4 is operated.

Slide 633 has a depending leg to which a pawl 636 is pivotally secured intermediate its ends by pin 637. At one end of the pawl 636 is positioned a pin 638 which engages spring 641 positioned and secured by means of a screw to the same leg of the slide to which the pawl is mounted whereby the pawl is normally biased into engagement with a ratchet 643 mounted on spindle 644 journaled in the upstanding legs of the base panel 631. During each indexing stroke, the pawl is guided near the end of its stroke by pawl guide 645 to further insure contact of the pawl with a tooth of the ratchet. A flat spring 646 element is secured to the base panel 631, the end of the spring being positioned to prevent clockwise rotation of the ratchet as illustrated in FIG. 41.

Figure 42:
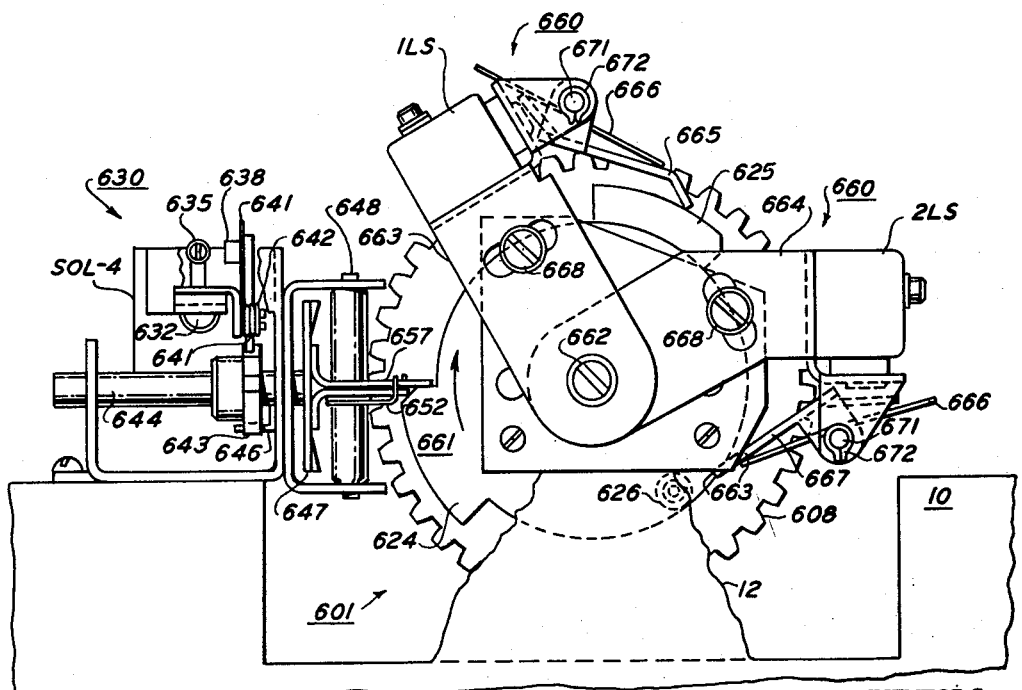
FIG. 42 is a left-hand view of the programmer mechanism.
Figure 43:
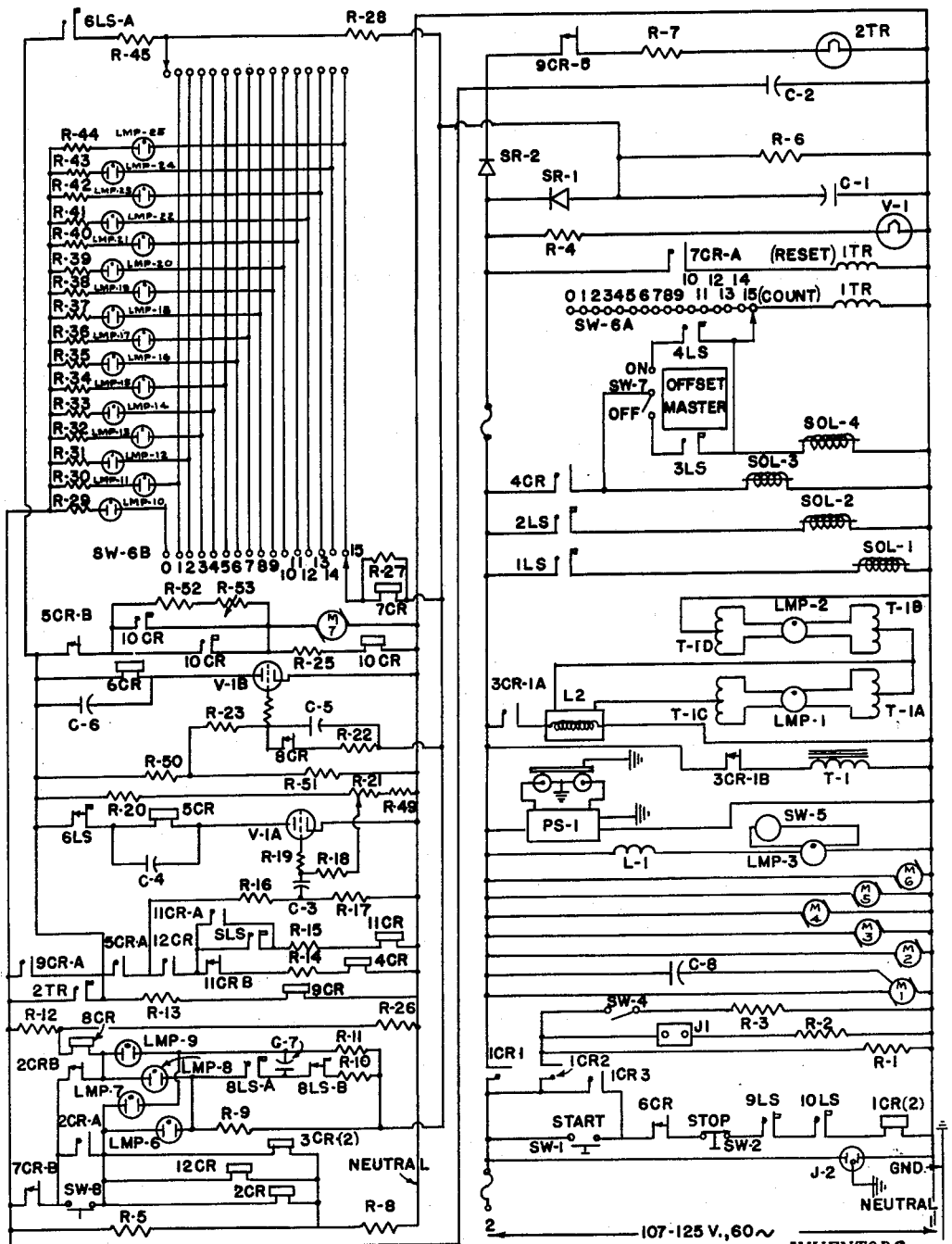
FIG. 43 is a schematic electrical wiring diagram of the xerographic apparatus.
Figure 45:
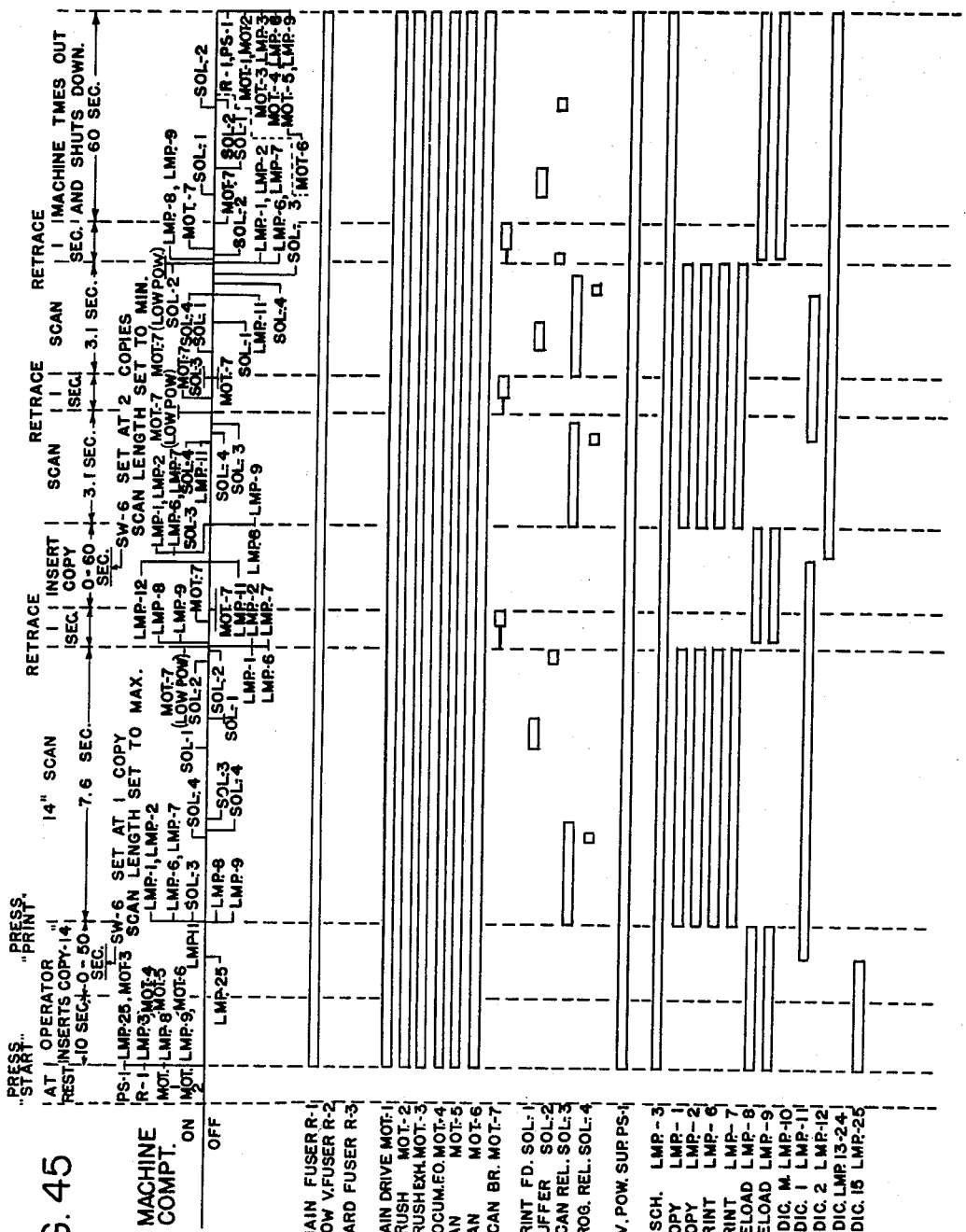
FIG. 45 is a timing chart of the operation of the fuser, motors, solenoids and lamps in the electrical circuit of FIG. 43.

As seen in FIG. 42 the spindle 644 also has affixed thereto a circular cam plate 647 having angular cam faces formed thereon. Mounted at right angles to the spindle is a latch shaft 648 journaled in lateral side plates of a U-shaped bracket 653 mounted on base panel 631, the shaft supporting the pair of complementary latch arms 651 normally biased into contact position to engage the cam risers of the clutch elements 615 and 616 by means of springs 652.

The microswitch assembly 660 consists of a mounting plate 661 secured to frame plate 12 so that the pivotal pin 622 threadedly engaged into the mounting plate 661 is concentric with the axis of the shaft SH-4. A pair of microswitch brackets 663 and 664 are pivotally secured by pin 662 and are adjustably secured to the support plate by means such as screws 668 which are threaded into the support plate and project through slots provide in the microswitch brackets. Each of the microswitch brackets 663 and 664 are provided with microswitches 1LS and 2LS, respectively. The microswitch 1LS is actuated by lever 665 spring biased by spring 666 in contacting relationship with either of the clutch elements 615 and 616 whereby as either of these clutch elements are rotated the lever will be actuated by the raised cam surfaces thereon. Microswitch 2LS is similarly operated by means of a lever 667 also biased into normally noncontacting position by means of spring 666, the operation of the microswitch being effected by the cam buttons 626 in clutch elements 615 and 616 as they are rotated.

Lever 665 and lever 667 are pivotally mounted to microswitch brackets 663 and 664, respectively, by means of pins 671 held in place on the brackets by snap rings 672.

Solenoid SOL-4 of the clutch release mechanism and microswitches 1LS and 2LS of the microswitch assembly are connected to a suitable electrical circuit, described hereinafter, the microswitches 1LS and 2LS controlling respectively the operation of the solenoid SOL-1 of the paper feed mechanism and solenoid SOL-2 of the paper pick-up mechanism.

In the operation of the programmer 50, clutch elements 611 and 613 are constantly rotated during the operation of the xerographic machine since they are fixed to programmer shaft SH-4 driven by main drive motor MOT1. Clutch elements 615 and 616, loosely mounted on shaft SH-4 so that they are free for relative rotation with respect to said shaft under conditions of clutch slippage, are prevented from normally rotating with said shaft SH-4 by means of the latch arms 651 adapted to engage the leading edge of the cam risers of the clutch elements 615 and 616.

As solenoid SOL-4 is energized, plunger 632 forces pawl 636 by engagement with ratchet 643 to index cam plate 647 to force a latch arm temporarily out of engagement with a cam riser of a clutch element 615 or 616 to release it for rotation with shaft SH-4 by means of its respective coacting clutch element 611 or 613. Once a clutch element 615 or 616 has been released for rotation it only rotates through one revolution, its motion again being arrested by a latch arm biased back into a clutch element engaging position by spring 652. During this single revolution the cam riser of the rotated clutch element 615 or 616 trips microswitch 1LS and then the cam bottom 626 thereon trips microswitch 2LS.

Figure 4:
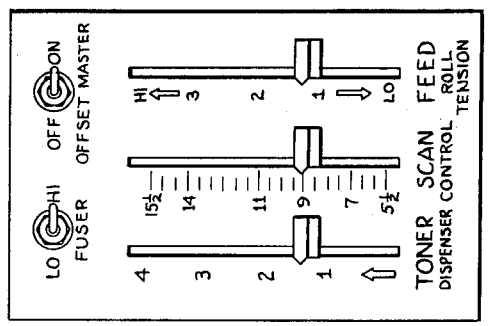
FIG. 4 is a view of the lower control panel of the apparatus located in the front, lower right-hand corner of the desk.

A clearer understanding of the operation of the xerographic apparatus and of the electrical circuit controlling the various elements can best be obtained by reference to the schematic wiring diagram and the timing sequence charts, the main operator-actuated switches and signal lights of the electrical circuit being illustrated in the drawings of the control panels shown in FIGS. 4 and 6.

Before the xerographic machine may be actuated, the doors on the right-hand side of the machine must be closed to close the door actuated interlock switches 9LS and 10LS mounted on the desk frame, not shown. These interlock switches are used so that the machine may be operated only when the doors are closed. This provision is made, not only from a standpoint of safety, but also to cause proper circulation of air through the machine by means of a pair of fans (not shown), driven by fan motors MOT5 and MOT6, mounted in the bottom of the desk to dissipate heat generated by the heat fuser 42.

The first operation on starting the machine is for the operator to press the start button or switch SW-1, which is the button on control panel 3 marked "On." This latches in the control relay 1CR which closes its own holding contact and maintains the relay closed. This closes contact 1CR1 which then applies power to fuser 42, the main drive motor MOT1 and motors MOT2, MOT3, MOT4, MOT5 and MOT6, discharge lamp LMP3, high voltage power supply PS-1 for the corona devices 22 and 34, and also a timing control unit that is energized through two selenium rectifiers SR-1 and SR-2, which immediately begin to charge their respective condensers, C-1 and C-2. In addition, the standby lamp has turned on the control panel, thus indicating to the operator that there is power on the machine.

As the D.C. voltage is applied, it activates 2TR which is a thermal time delay relay set for approximately 10 seconds. This provides adequate time to pre-heat the vacuum tube filaments of the system and also to pre-heat the fuser 42 before the machine can start to make copies. As the time delay elapses, the contact on 2TR closes and actuates control relay 9CR which closes 9CRA. This parallels the 2TR contact and takes over its function to apply D.C. voltage to the timing control unit. At the same time contact 9CRB opens to remove power from timer 2TR. This, in effect, cuts 2TR out of the circuit and lets it cool, in preparation for the next operating cycle.

This function of turning 2TR off at this point is necessary, because if it is not turned off immediately and the machine is shut off and then immediately restarted, the ten-second delay period would not be available to bring the various elements up to their required operating conditions before a reproduction operation is started. At any time up to this point the operator can put a copy on platen 107 and press the print button, switch SW-8, on control panel 3 to start the machine making a print. In the event the operator has put the copy in and pressed the print button prior to the time that 2TR has timed out, the machine is conditioned to make a copy, but won't start to make it. Switch SW-8 is effective to energize relays 2CR and 3CR. 3CR controls the fluorescent lights LMP1 and LMP2 so that they are activated at this point. 2CR closes contact 2CR1A and opens 2CR1B to switch the light on the main panel over from reload to print. The reload light, lamp LMP8 or LMP9 then goes out, and the print light lamp LMP6 or LMP7 goes on, which tells the operator that the machine is in effect making, or set up to make a print. At the same time that 2CR1B opens, it also de-energizes 8CR which places a short on the capacitor C-5. The short is normally there when 8CR is activated, but in this case 8CR is deactivated to put the short back on capacitor C-5 for the one second timer V-1B so that the one second timer cannot time out. The timer V-1B should not time out as long as the machine is making a print. This timer only times out when the machine is not in use. As 2CR closes, 12CR will also close to set up a partial circuit to 4CR.

Thus, no machine components are actuated until the ten-second delay timer 2TR and the contact 9CRA of relay 9CR closes. As timer 2TR and contact 9CRA of relay 9CR close, the one-second timer V-1A is activated to close relay 5CR to establish a circuit through 9CRA, 5CRS, 12CR and 11CRB which are closed at this time, and relay 4CR is activated to start the scan cycle. Relay 4CR activates the scan release solenoid SOL-3 to trip pawl 221 into engagement with a tooth of drive ratchet 212 thereby connecting the lens drive pulley 206 and lamp drive pulley 214 of the scan control mechanism 48 to the drum shaft SH-6 which is already rotating. There is a short delay between scan release and the actual point at which the machine begins to scan the copy. This is a short space of time, which when translated into the distance moved by the lamp 120, for example, amounts to about three-eights of an inch. The purpose for this time lag in the system is to enable the movable elements of the optical system and scan release mechanism to overcome any backlash before the actual beginning of scan of the leading edge of the copy.

After the start of scan as the lamp drive pulley rotates 214 rotates with the shaft SH-6, the actuator studs on said pulley actuate either the two-second switch 3LS or the one and five-eights second switch 4LS, depending on which way switch SW-7 is thrown. The only difference between these two switches is the fact that they are positioned to be tripped a fixed distance in time with respect to each other from the start of scan. If the switch 4LS is placed in the system by switch SW-7, the transfer material is forwarded to the drum 20 to place the leading edge of the transfer material three-quarters of an inch in advance of the leading edge of the copy image. This is used for duplicating masters or other larger sheets where it is desirable to leave the three-quarter inch edge so that the master can be bound into a press. Normally the two-second switch, 3LS, is used. At this point when switch 3LS is tripped, two things are accomplished: The programmer release, solenoid SOL-4, is energized and trips counter 1TR on the automatic stepper for the programming of copies.

At this point the programmer takes over the further functions of the machine; in other words, the programmer is synchronized to the point at which the machine started scanning the copy and it will sequentially trip the separator rollers 451, the feed roller 401, by means of solenoid SOL-1 and solenoid SOL-2 of the paper pick-off mechanism 36 at the proper point to feed paper or other transfer material to coincide with the image on the drum, and to take this paper off the drum and deposit it on the belt of the horizontal conveyor for transport to the fuser 42.

Immediately thereafter, 2½-second switch 5LS is closed to actuate relay 11CR which is held by its own contact. Relay 11CR through contact 11CRB drops out relay 4CR which up to this point has actuated the scan release solenoid SOL-3, held it in, and through its contact has actuated the solenoid SOL-4 and counter 1TR; so that the entire circuit has been de-energized at this time. At this point the scanning action has continued until the end of scan, which is very slightly off the end of the document. The end of scan switch 6LS is then tripped through 6LSB dropping out the timer V-1A which has been passing current up to this time and has held 5CR closed. As this occurs, 5CRA is opened, and this drops out relay 11CR which has been held in. At the same time, in opening the switch 6LS, the resistance network which consists of resistor R17, capacitor C-3 and resistor R18 is connected to ground, instead of its normal connection to a positive voltage source, to reverse the voltage at the point between capacitor C-3 and resistor R19. This point goes negative and cuts off timer V-1A. Now 6LSB has only momentarily opened and will close again immediately as soon as the carriage begins its return travel; but the timer V-1A cannot fire again until capacitor C-3 discharges sufficiently through said network to bring the grid on timer V-1A back up to near zero. This causes a time delay in this circuit.

As soon as this circuit reaches a sufficient positive potential, which requires approximately one second, timer V-1A will pass enough current to close relay 5CR again which recloses contact 5CRA which, if the machine is set to make multiple copies, will again close relay 4CR and restart the scanning action. Prior to the time that this happens and while the scan mechanism is on its retrace cycle, a small D.C. current is applied through contact 5CRB and through resistors R52 and R53 to scan brake MOT7 which is a small shaded pole brake motor. This functions to place a small drag on the system so that when the spring 203 is returning the lens carriage 156 and lamp carriage 120 back to their starting positions, their rate of return is controlled. The carriages return at a high rate of speed until the switch 7LS is closed, which is approximately an inch away from the beginning of scan position as measured by the travel of the lamp carriage 120. Now, with switch 7LS closed, full voltage will be applied to relay 10CR and its contact then will close to apply full voltage to scan brake motor MOT7. At that point the braking force suddenly increases sufficiently so that scan brake motor MOT7 slows the carriages down very quickly, in a matter of ⅛ or ¼ of an inch of carriage travel, and brings them to a gradual stop. After full voltage is applied to the motor MOT7, it stops the carriages approximately in the position of switch 7LS, which is about an inch away from the beginning of scan. The carriages are held at this point until the timing sequence that has been described previously through V-1A is completed. When this is completed and relay 5CR closes again, the contact 5CRB which has activated all of this braking network to the motor is broken; so that the brake motor is released and the carriages are now free to come home.

When relay 5CR closes again, relay 4CR is again activated, and scan release solenoid SOL-3 is again energized to condition the carriage activating mechanism for the next scan cycle. If the solenoid SOL-3 is actuated and the lamp drive pulley 214 is not back to its original starting position, the pawl 221 runs into the solenoid SOL-3 mechanism to perform the same function as if the pawl on said pulley had been in position to be engaged by the solenoid lever; so, in effect, it trips it off mechanically again, for another scan.

This process of scan and return continues until the machine has made the last copy; i.e., if the multicopy timer has been set for five copies and the machine is now making the fifth copy, everything will be the same up to the point when the end of scan switch 6LS is actuated for the last copy. To set the machine for making five reproductions of a single original the operator must set selector switch SW-6B to position number 5 on the control panel 3. As shown, the elector switch SW-6B has been arbitrarily shown at position number 15 to set the circuit in condition for the machine to make 15 reproductions or copies of an original. On the extreme right-hand side of the circuit drawing, there are shown a series of stepper contacts that have been progressively stepping up each time from zero—each time a single copy or a single scan is made the contact CR steps up one position. On the last time around these two are now interconnected by the conductor which runs between the stepper contact and the switch contact SW-6B, so now the last time around, when the end of scan switch 6LS is actuated, a circuit is completed through switch contact 6LSA through the contact on the stepper switch SW-6, over to the contact on SW-6B, down through 7CR, which closes relay 7CR momentarily for just as long as 6LSA is held. This applies full voltage to energize relay 7CR, thereby closing contact 7CRA and tripping reset coil 1TR which immediately takes this stepper contact and throws it back to zero by a spring return which is built into the stepper. It is just released and is free to fly back, but just before it does so, while relay 7CR is closed, 7CRB opens, and this opens up relay 2CR which has been held in all of this time. As 2CR opens, the entire control circuit in effect is de-energized so that the circuit cannot restart itself again. This, in effect, calls for the end of whatever number of copies the operator has programmed the machine. At the time that the relay is dropped out, the print light goes out and the reload light goes back on to indicate to the operator that the machine is finished making the desired number of copies.

At this point the one-minute timer V-1B is again energized, because as relay 2CR is dropped out, the contact 2CR1B is closed, lighting the reload lamps LMP8 or LMP9; but at the same time it also activated relay 8CR. When relay 8CR is activated, 8CR contact is opened and removes the short from capacitor C5. This capacitor is now free to charge throughout the period that the operator is not using the machine. If it charges sufficiently to apply close to zero potential to the grid of V-1B, the tube will begin to pass enough current to close relay 6CR. As that relay 6CR closes, it opens the 6CR contact which is in series with the main power relay, 1CR. When this occurs, 1CR drops out and the entire machine is shut down. This cycle requires a one-minute interval which is specifically set up so that if the operator does not use the machine for a period of one minute, the machine will automatically shut down. The operator will not normally push a stop button; he will just stop using the machine and it will turn itself off. At the same time, the one-minute interval gives the operator enough time to change copies or effect other supervisory operations before automatic shut-off. In the event of a malfunction, an emergency stop switch SW-2 is provided on control panel 3 to enable the operator to stop the machine immediately.

Several other parts of the circuit that have not been described up to this point are tied in with relay 12CR. Switch 8LS is a small microswitch which is attached to the cam arm 494 of the paper feed system. If switch 8LS is actuated this places capacitor C-7 across the circuit for lamps LMP6 and LMP7 or lamps LMP8 and LMP9, whichever pair is lit, and makes a relaxation flip-flop circuit out of them. This causes the appropriate pair of lamps to alternately go on and off to give a warning to the operator of a short supply of transfer material in paper tray 411.

Referring again to the stepper system, there is provided a series of lamps LMP11 to LMP25, inclusive, connected to the conductor lines, between the selector switch SW-6B and the stepper, in such a way that whichever contact the selector switch is on, a circuit is completed such that one of the lamps will light; i.e., this is an indicator to the operator of the number of copies to be made. By the same token the stepper contact also lights a lamp through a circuit from ground up through resistor R28, through whichever parts it is set on and then up through a lamp and resistor combination to the B+ line. As a result, there are usually two lamps lit on the panel; one is the light which indicates the number of copies that the operator has set the machine to make; and the other light indicates the number of the copy that the machine is now working on.

The position D on the selector switch SW-6 is for multicopy or duplicating position and is indicated by lamp LMP10. The second deck of switch SW-6, shown in the lower right-hand portion of the circuit drawing is controlled by switch SW-6A. The position D on this second deck is open so that whenever selector switch SW-6 is set on D the effect is to disconnect the stepping or count coil of counter 1TR. In this setting the stepper is not advanced when the machine makes a copy, so that the machine can not count out. Once the selector switch SW-6 has been set on position D, the machine runs as an open duplicator until it is turned off by the operator. In this type of operation, the operator may conveniently stop the duplicating operation, when desired, by manually shifting the selector switch SW-6 from position D to position 1, so that the machine will at that point make one more copy and then shut off.

For controlling the operation of the paper feed and puffer mechanisms, the programmer includes switches 1LS and 2LS, respectively, as described above, to initiate the operation of these devices in timed relation to the operation of the scanning mechanism. In timed relation to the start of machine operation, the switch 1LS is actuated to energize solenoid SOL-1 to shift clutch element 514 into engagement with clutch element 512 to drive the separator rollers 451 which advance a sheet from the pack of transfer material to the feed rollers 401 and 402. This is a time sequence operation to allow just enough time to get the sheet up into the V formed by the rollers and add a slight buckle to the sheet. At that time the switch 1LS drops out again, de-energizing solenoid SOL-1, and the rollers 401 and 402 grip the transfer material and pull it forward and advance it against the drum. The transfer material is then advanced by the drum to the pick-off mechanism 36. As the transfer material arrives at the pick-off position, either cam button 626 is in position momentarily to close switch 2LS, to energize puffer solenoid SOL-2, to cause a blast of air to be blown against the leading edge of the paper, flipping it off the drum and onto the transfer belt of the horizontal conveyor.

As explained above, a preferred form of fusing apparatus for use in the present system is disclosed in copending application S.N. 797,143, now U.S. Patent No. 2,965,863 and includes a plurality of resistance-type heating elements in a circuit arrangement to provide three independently controlled heating units. Heating unit R1 is for normal line voltage conditions and for regular paper. In the event of low voltage conditions where there is inadequate wattage, there is provided an adjustment or a connector J-1 to connect a second heating unit R2 into the fuser to increase its wattage by approximate-one-hird. The third heating unit R3 can be connected by the operator, if required, in order to fuse powder images on card stock or heavy transfer material for which a higher heat output is necessary. For this purpose there is provided a card stock switch, SW-4, which is located on the front panel 7.

Motor MOT5 and motor MOT6 are two fan motors which are located in the bottom of the desk. Circular six-inch fans are driven by these motors for moving main circulating and cooling air throughout the whole machine. Motor MOT4 drives the document feed-out rolls, motor MOT2 rotates the brush of the drum cleaning device 46, and motor MOT3 drives an exhaust fan for the drum cleaning device, all as previously described.

While the invention has been described with reference to the structures disclosed herein, it is not confined to the details set forth, and this application is intended to cover such modifications or changes as may come within the purposes of the improvements or the scope of the following claims.

What is claimed is:

1. Apparatus for the removal of sheet transfer material electrostatically adhering to a photoconductive printing surface having a powder image previously formed thereon which has been substantially transferred to the transfer material, the powder image being maintained on the drum and on the transfer material by electrostatic forces only; the apparatus including a pulsator means for cyclic compression of aeriform fluid, a discharge manifold having multiple parallel spaced discharge nozzles connected to said pulsator means, mounting means connected to said discharge manifold to permit mounting of said discharge manifold adjacent to said photoconductive printing surface, whereby jets of compressed aeriform fluid may be directed by said discharge nozzles against said photoconductive printing surface in advance of the leading edge of the transfer material to separate the leading edge of the transfer material therefrom, and timing means connected to said pulsator means to limit the duration of the jets of compressed aeriform fluid from said discharge nozzles so that the powder image adhering to said xerographic drum and to the transfer material is not dislodged therefrom.

2. In a xerographic reproducing apparatus wherein an electrostatic latent image formed on a rotating xerographic drum is developed by a powder to form a visible powered image on the xerographic drum which is then transferred from the xerographic drum to sheet material, the sheet material adhering electrostatically to the xerographic drum during the transfer process, the powder image being maintained on the sheet material by electrostatic forces; the combination of a discharge manifold having multiple parallel spaced discharge nozzles, mounting means connected to said discharge manifold for positioning said discharge manifold adjacent to said xerographic drum and parallel with the axis of said xerographic drum so that said discharge nozzles lie in a plane of achord of said xerographic drum, a compressed aeriform fluid source means connected to said discharge manifold so that jets of compressed aeriform fluid may be directed by said discharge nozzles against said xerographic drum to separate the leading edge of sheet material from said xerographic drum, and timing means to limit the duration of the jet streams from said nozzles so that the powder adhering to the sheet material is not blow therefrom.

3. A sheet pick-off apparatus for the removal of sheet transfer material superposed on a powder image previously formed on a drum with its leading edge extending beyond the powder image, the transfer material electrostatically adhering to the surface of said drum, said sheet-pick-off apparatus including a manifold having multiple parallel spaced discharge nozzles for the discharge of compressed aeriform fluid, and inlet means; mounting means connected to said manifold for positioning said manifold adjacent to said drum with said discharge nozzles of said manifold positioned to direct jets of compressed aeriform fluid against the surface of said drum in advance of the leading edge of transfer material thereon, a pulsator operatively connected to said inlet means of said manifold for supplying compressed aeriform fluid to said manifold, drive means operatively connected to said pulsator for actuating said pulsator, and timing means connected to said drive means for controlling the operation of said pulsator whereby the duration of the flow of compressed aeriform fluid from said pulsator is limited so that the powder image adhering electrostatically to said transfer material is not dislodged therefrom.

References Cited in the file of this patent

UNITED STATES PATENTS

| | | |
|---|---|---|
| 1,595,478 | Minton | Aug. 10, 1926 |
| 2,357,809 | Carlson | Sept. 12, 1944 |
| 2,576,047 | Schaffert | Nov. 20, 1951 |
| 2,905,465 | Armstrong | Sept. 22, 1959 |